US012542360B2

(12) United States Patent
Kwon et al.

(10) Patent No.: US 12,542,360 B2
(45) Date of Patent: Feb. 3, 2026

(54) LAMINATED PATCH ANTENNA, ANTENNA ARRAY, AND ANTENNA PACKAGE

(71) Applicant: Samsung Electronics Co., Ltd., Suwon-si (KR)

(72) Inventors: Taeksun Kwon, Suwon-si (KR); Chanju Park, Suwon-si (KR); Jungi Jeong, Suwon-si (KR); Jungwoo Seo, Suwon-si (KR); Seungyoon Lee, Suwon-si (KR); Dongjin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 18/563,132

(22) PCT Filed: Apr. 19, 2022

(86) PCT No.: PCT/KR2022/005592
§ 371 (c)(1),
(2) Date: Nov. 21, 2023

(87) PCT Pub. No.: WO2022/250294
PCT Pub. Date: Dec. 1, 2022

(65) Prior Publication Data

US 2024/0266744 A1 Aug. 8, 2024

(30) Foreign Application Priority Data

May 25, 2021 (KR) ........................ 10-2021-0066697
Aug. 26, 2021 (KR) ........................ 10-2021-0113399

(51) Int. Cl.
*H01Q 9/04* (2006.01)
*H01Q 21/00* (2006.01)
*H01Q 21/06* (2006.01)

(52) U.S. Cl.
CPC ....... *H01Q 9/0414* (2013.01); *H01Q 21/0006* (2013.01); *H01Q 21/065* (2013.01)

(58) Field of Classification Search
None
See application file for complete search history.

(56) References Cited

U.S. PATENT DOCUMENTS 7,109,926 B2 9/2006 Du Toit
9,865,928 B2 1/2018 Sudo et al.
(Continued)

FOREIGN PATENT DOCUMENTS

KR 20-0464997 Y1 1/2013
KR 10-2015-0041054 A 4/2015
(Continued)

OTHER PUBLICATIONS

Samsung Electronics; 6G: The Next Hyper-Connected Experience for All; White Paper; Oct. 2021.
(Continued)

*Primary Examiner* — Crystal L Hammond
(74) *Attorney, Agent, or Firm* — Jefferson IP Law, LLP

(57) ABSTRACT

A stacked patch antenna includes an upper ground plate including a first upper hole, a first feed pad provided on the upper ground plate, a first feed line extending from the first feed pad along a first direction, a lower antenna patch provided on the first feed pad, an upper antenna patch provided on the lower antenna patch, a first upper pad provided in the first upper hole, and a first upper stub protruding from a side surface of the first upper pad.

15 Claims, 24 Drawing Sheets

(56) References Cited

U.S. PATENT DOCUMENTS

| | | | | |
|---|---|---|---|---|
| 9,929,472 | B2 | 3/2018 | Rojanski et al. | |
| 10,381,733 | B2 | 8/2019 | Hwang et al. | |
| 10,727,580 | B2 | 7/2020 | Rajagopalan et al. | |
| 11,303,021 | B2 | 4/2022 | Yun et al. | |
| 11,482,787 | B2 | 10/2022 | Jang et al. | |
| 11,777,221 | B2 | 10/2023 | Ueda et al. | |
| 11,936,125 | B2 | 3/2024 | Sudo | |
| 2018/0269585 | A1* | 9/2018 | Kim | H01Q 21/24 |
| 2020/0161766 | A1 | 5/2020 | Liu et al. | |
| 2020/0303821 | A1* | 9/2020 | Lee | H01Q 5/335 |

FOREIGN PATENT DOCUMENTS

| | | | |
|---|---|---|---|
| KR | 10-2018-0046866 | A | 5/2018 |
| KR | 10-2019-0062064 | A | 6/2019 |
| KR | 10-2001575 | B1 | 7/2019 |
| WO | 2009/042065 | A1 | 4/2009 |
| WO | 2019/208362 | A1 | 10/2019 |
| WO | 2020/217689 | A1 | 10/2020 |

OTHER PUBLICATIONS

Zhang et al.; Low-cost aperture-coupled 60 GHz phased array antenna package with compact matching network; IEEE Transactions on Antennas and Propagation; 65 (12); pp. 6355-6362; Jul. 2017.

International Search Report with Written Opinion and English translation dated Aug. 8, 2022; International Appln. No. PCT/KR2022/005592.

Extended European Search Report dated Jun. 27, 2024; European Appln. No. 22811487.2-1201/4290699 PCT/KR2022005592.

Korean Office Action dated Sep. 26, 2025, issued in Korean Application No. 10-2021-0113399.

* cited by examiner

LAMINATED PATCH ANTENNA, ANTENNA ARRAY, AND ANTENNA PACKAGE

TECHNICAL FIELD

The present disclosure relates to a stacked patch antenna, an antenna array, and an antenna package.

BACKGROUND ART

A stacked patch antenna is a patch antenna including a lower antenna patch and an upper antenna patch stacked to be spaced apart from each other. The stacked patch antenna may have a direct feeding structure or an indirect feeding structure. In the case of the direct feeding structure, a via is directly connected to the lower antenna patch to feed the lower antenna patch. In the case of the indirect feeding structure, the lower antenna patch is fed by a feed line located under the lower antenna patch and spaced apart from the lower antenna patch.

In the case of an antenna array including a plurality of antennas, a wide steering range is secured by narrowing an interval between antennas. When an interval between antennas is narrow, coupling between antennas occurs, impedance matching is degraded, and thus, an operating bandwidth of the antenna array is less than that of individual antennas. Accordingly, the operating bandwidth of individual antennas is required to be greater than the operating bandwidth required for an antenna array.

An operating bandwidth of a stacked patch antenna varies according to a size difference between an upper antenna patch and a lower antenna patch. As a size difference between the upper antenna patch and the lower antenna patch increases, an operating bandwidth of the stacked patch antenna increases, but the risk of impedance mismatch between an impedance of the stacked patch antenna and an external impedance also increases.

DISCLOSURE

Technical Problem

A technical objective is to provide a stacked patch antenna with broadband characteristics.

A technical objective is to provide an antenna array and an antenna package including a stacked patch antenna with broadband characteristics.

A technical objective is to provide a stacked patch antenna capable of performing impedance matching even when an upper antenna patch and a lower antenna patch have a large size difference.

A technical objective is to provide an antenna array and an antenna package including a stacked patch antenna that implements a broadband matching circuit capable of performing impedance matching even when an upper antenna patch and a lower antenna patch have a large size difference.

However, technical objectives are not limited thereto.

Technical Solution

In an aspect, a stacked patch antenna includes an upper ground plate including a first upper hole, a first feed pad provided on the upper ground plate, a first feed line extending from the first feed pad along a first direction, a lower antenna patch provided on the first feed pad, an upper antenna patch provided on the lower antenna patch, a first upper pad provided in the first upper hole, and a first upper stub protruding from a side surface of the first upper pad.

A size of the upper antenna patch along the first direction may be 15% or more greater than a size of the lower antenna patch along the first direction.

The stacked patch antenna may further include a second feed pad provided on the upper ground plate, and a second feed line extending from the second feed pad along a second direction intersecting the first direction, wherein a size of the upper antenna patch along the second direction is 15% or more greater than a size of the lower antenna patch along the second direction.

The stacked patch antenna may further include a second upper pad overlapping the second feed pad along a third direction perpendicular to the first and second directions, and a second upper stub protruding from a side surface of the second upper pad.

The first feed line may be provided between the lower antenna patch and the upper ground plate.

The stacked patch antenna may further include a lower ground plate provided opposite to the lower antenna patch with the upper ground plate therebetween, a first lower pad provided in a first lower hole, and a first lower stub protruding from a side surface of the lower pad, wherein the first lower stub is spaced apart from the lower ground plate.

The stacked patch antenna may further include a second lower stub protruding from a side surface of the lower pad, wherein the second lower stub is spaced apart from the lower ground plate.

The stacked patch antenna may further include a second lower stub protruding from a side surface of the lower pad, wherein the second lower stub contacts the lower ground plate.

The first lower stub may protrude from one side of the lower pad, and may be connected to the other side of the lower pad.

The first upper stub may be spaced apart from the upper ground plate.

The stacked patch antenna may further include a second upper stub protruding from the upper ground plate, wherein the second upper stub contacts the upper ground plate.

The stacked patch antenna may further include a third upper stub located opposite to the first upper pad with the first upper stub therebetween, wherein the third upper stub has a ring shape, and is spaced apart from the upper ground plate.

The stacked patch antenna may further include a fourth upper stub provided between the third upper stub and the upper ground plate, wherein the fourth upper stub contacts the third upper stub and the upper ground plate.

The stacked patch antenna may further include a feed stub protruding from the first feed pad.

The feed stub may protrude from one side of the first feed pad, and may be connected to the other side of the first feed pad.

The stacked patch antenna may further include an auxiliary pad provided in an area surrounded by the feed stub and the first feed pad, wherein the auxiliary pad is spaced apart from the feed stub and the first feed pad.

The stacked patch antenna may further include a connection pad located opposite to the first feed pad with the first feed line therebetween, and a connection via provided between the connection pad and the lower antenna patch, wherein the connection via contacts the connection pad and the lower antenna patch.

The stacked patch antenna may further include a protruding pad protruding from a side surface of the lower antenna patch, wherein the protruding pad and the connection pad face each other.

In an aspect, an antenna array includes a plurality of stacked patch antennas, wherein each of the plurality of stacked patch antennas includes an upper ground plate including a first upper hole, a first feed pad provided on the upper ground plate, a first feed line extending from the first feed pad along a first direction, a lower antenna patch provided on the first feed pad, an upper antenna patch provided on the lower antenna patch, a first upper pad provided in the first upper hole, and a first upper stub protruding from a side surface of the first upper pad.

In an aspect, an antenna package includes a plurality of stacked patch antennas, and a control chip configured to provide a high-frequency electrical signal (or a high-frequency feed signal) to the plurality of stacked patch antennas, wherein each of the plurality of stacked patch antennas includes an upper ground plate including a first upper hole, a first feed pad provided on the upper ground plate, a first feed line extending from the first feed pad along a first direction, a lower antenna patch provided on the first feed pad, an upper antenna patch provided on the lower antenna patch, a first upper pad provided in the first upper hole, and a first upper stub protruding from a side surface of the first upper pad.

MODE FOR INVENTION

Figure 1:
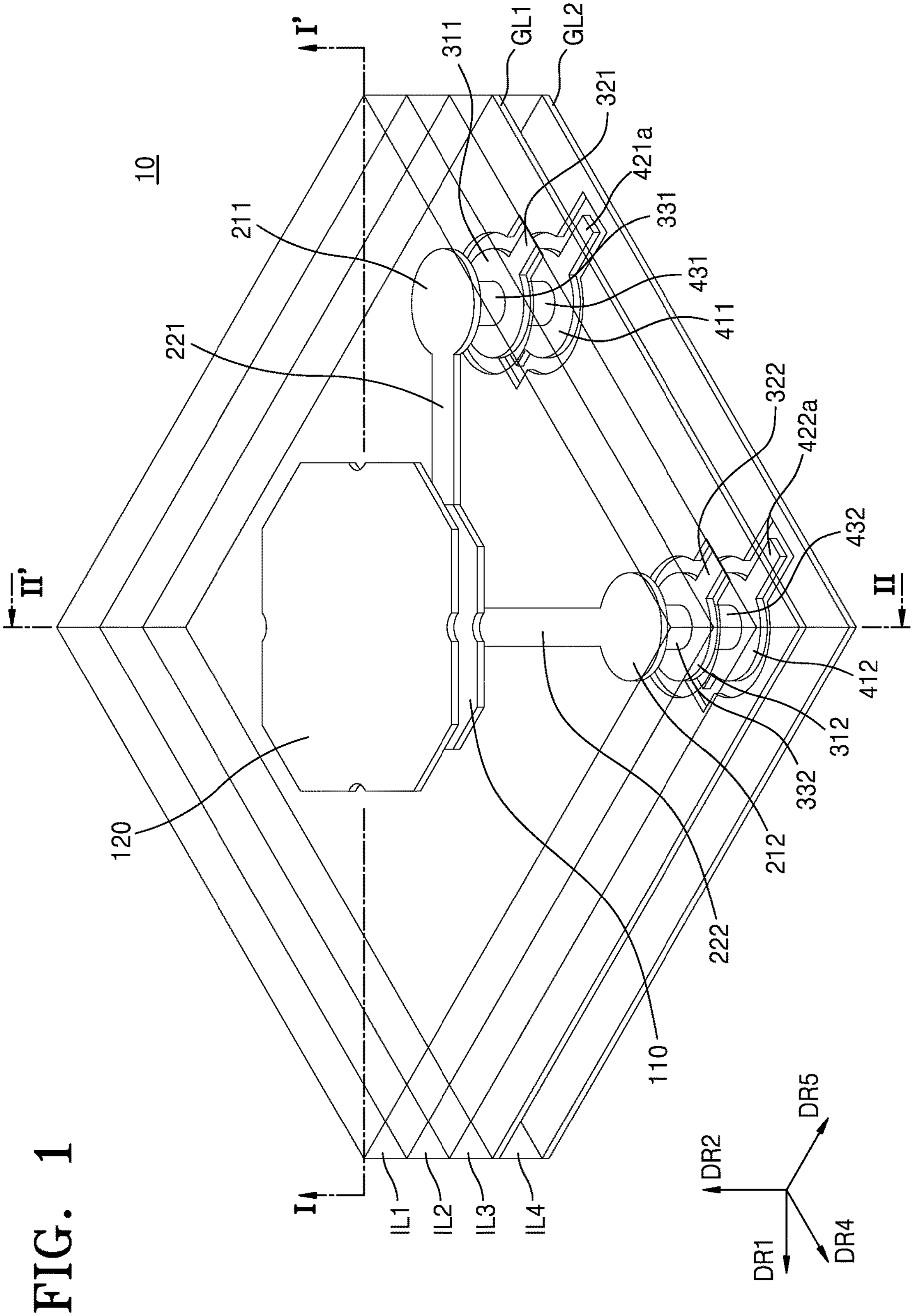
FIG. 1 is a perspective view illustrating a stacked patch antenna according to an exemplary embodiment.

Hereinafter, embodiments of the present disclosure will be described with reference to the drawings. Like reference numerals denote like elements throughout, and in the drawings, sizes of elements may be exaggerated for clarity and convenience of explanation. The embodiments described below are merely examples, and various modifications may be made from the embodiments.

When an element is referred to as being "on" another element, it may be directly on the other element, or intervening elements may be present therebetween.

The singular forms "a," "an," and "the" are intended to include the plural forms as well, unless the context clearly indicates otherwise. When a part "includes" an element, another element may be further included, rather than excluding the existence of the other element, unless otherwise described.

Figure 2:
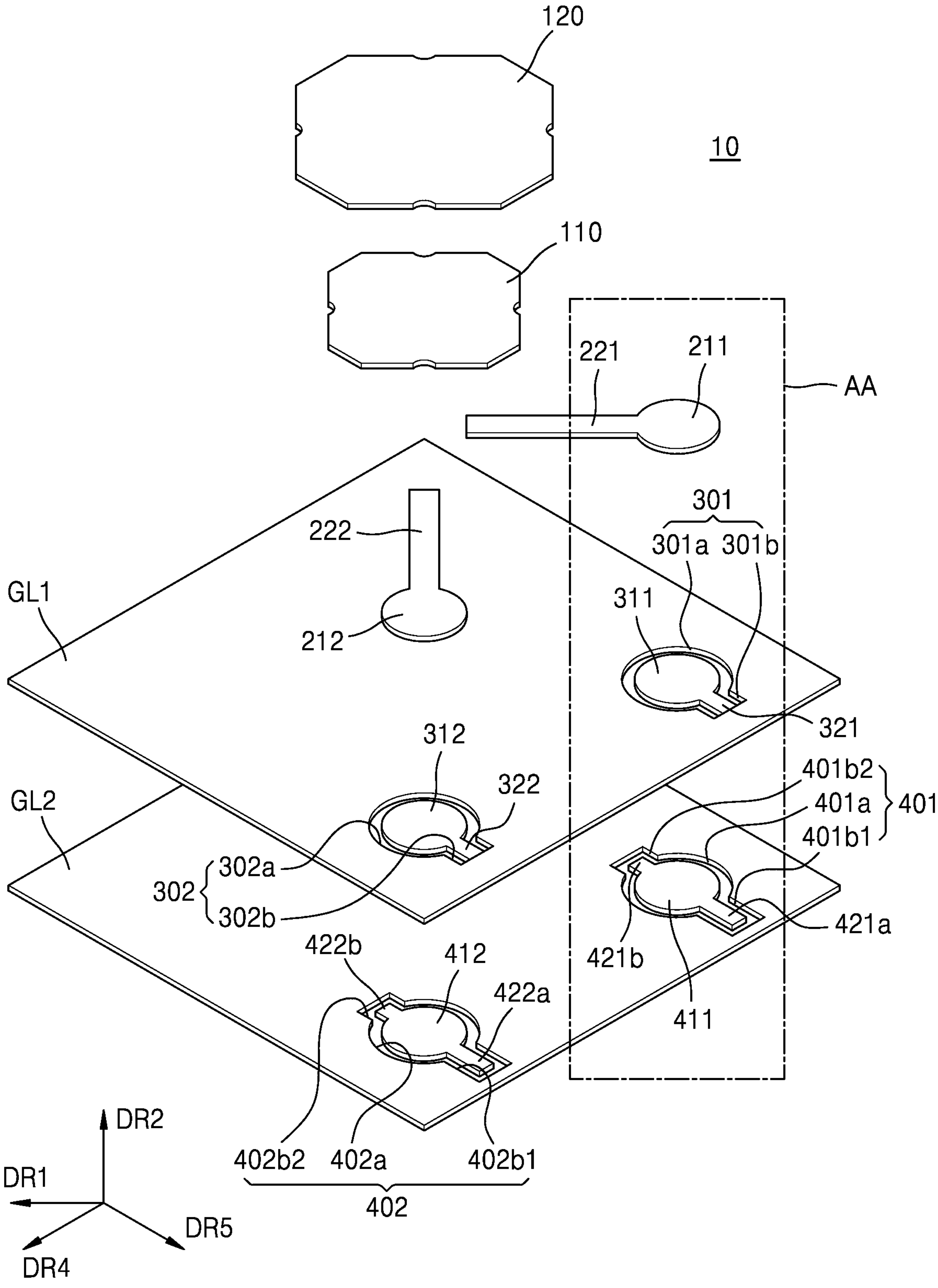
FIG. 2 is an exploded perspective view illustrating the stacked patch antenna of FIG. 1.
Figure 3:
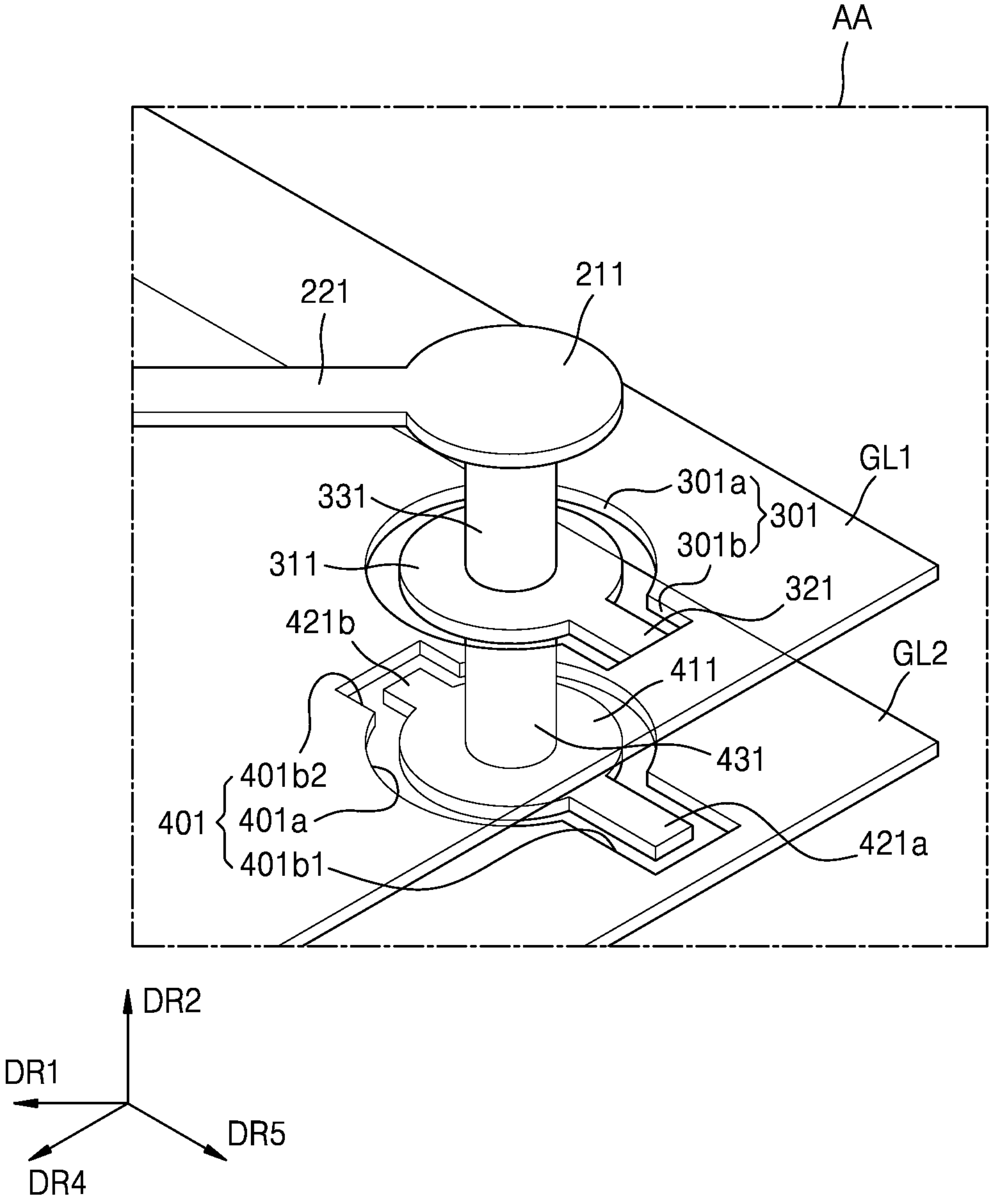
FIG. 3 is an enlarged view illustrating a portion AA' of FIG. 2.
Figure 4:
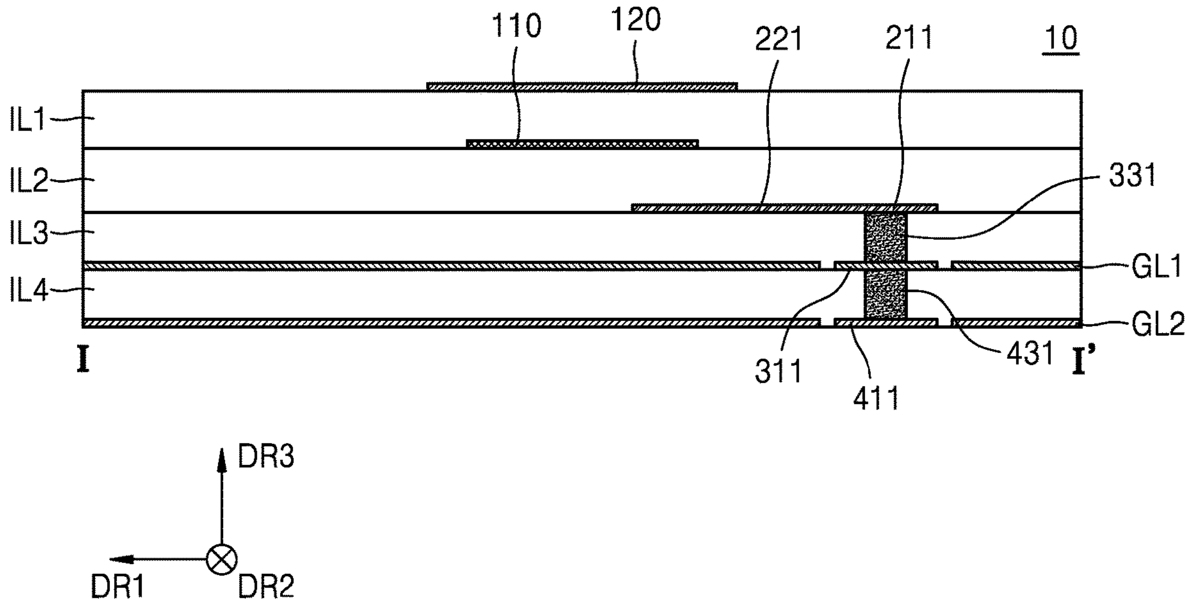
FIG. 4 is a cross-sectional view taken along line I-I' of the stacked patch antenna of FIG. 1.
Figure 5:
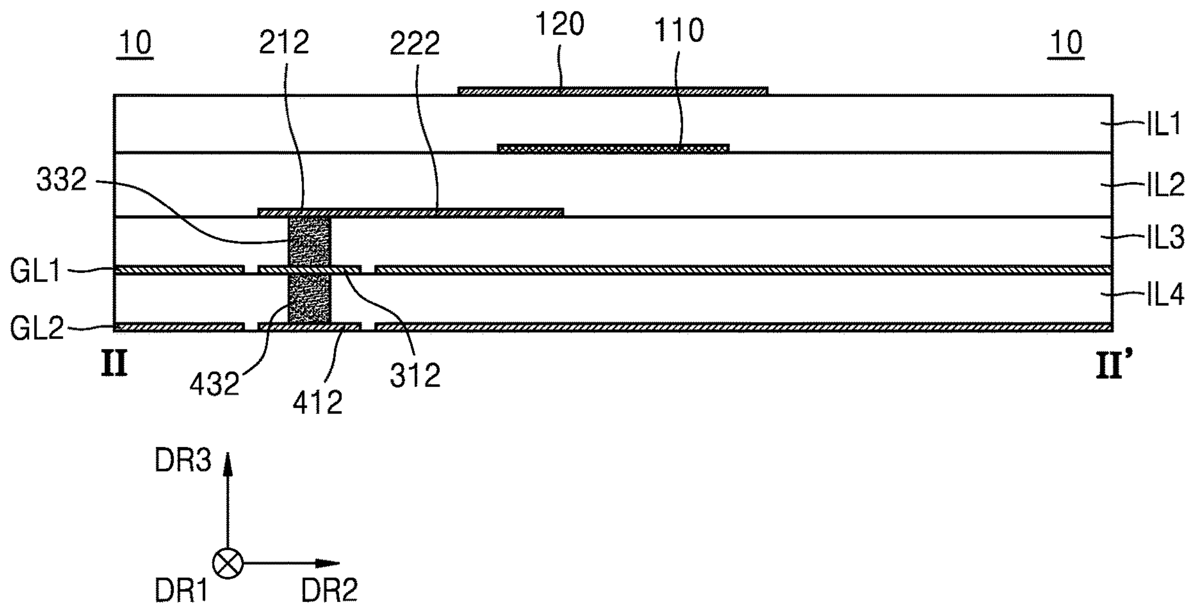
FIG. 5 is a cross-sectional view taken along line II-II' of the stacked patch antenna of FIG. 1.

FIG. 1 is a perspective view illustrating a stacked patch antenna according to an exemplary embodiment. FIG. 2 is an exploded perspective view illustrating the stacked patch antenna of FIG. 1. FIG. 3 is an enlarged view illustrating a portion AA' of FIG. 2; FIG. 4 is a cross-sectional view taken along line I-I' of the stacked patch antenna of FIG. 1. FIG. 5 is a cross-sectional view taken along line II-II' of the stacked patch antenna of FIG. 1.

Referring to FIGS. 1 to 5, a lower antenna patch 110 and an upper antenna patch 120 may be provided. Each of the lower antenna patch 110 and the upper antenna patch 120 may have a plate shape extending along a first direction DR1 and a second direction DR2. The lower antenna patch 110 and the upper antenna patch 120 may have substantially the same shape. For example, each of the lower antenna patch 110 and the upper antenna patch 120 may have a square shape. However, shapes of the lower antenna patch 110 and the upper antenna patch 120 are not limited, and may vary as needed. The lower antenna patch 110 may be spaced apart from the upper antenna patch 120 along a third direction DR3. For example, the first to third directions DR1, DR2, and DR3 may be perpendicular to each other. The upper antenna patch 120 and the lower antenna patch 110 may face each other along the third direction DR3. For example, the center of the upper antenna patch 120 and the center of the lower antenna patch 110 may be arranged along the third direction DR3. Each of the lower antenna patch 110 and the upper antenna patch 120 may include an electrically conductive material. For example, each of the lower antenna patch 110 and the upper antenna patch 120 may include copper (Cu), aluminum (Al), gold (Au), or silver (Ag).

A size of the upper antenna patch 120 may be greater than a size of the lower antenna patch 110. A size of the upper antenna patch 120 and a size of the lower antenna patch 110 may be sizes along a longitudinal direction (the first direction DR1) of an X feed line 221 described below or a longitudinal direction (the second direction DR2) of a Y feed line 222 described below. For example, a size of the upper antenna patch 120 along the first direction DR1 may be 15% or more greater than a size of the lower antenna patch 110 along the first direction DR1. For example, a size of the upper antenna patch 120 along the second direction DR2 may be 15% or more greater than a size of the lower antenna patch 110 along the second direction DR2.

A first dielectric layer IL1, a second dielectric layer IL2, a third dielectric layer IL3, and a fourth dielectric layer IL4 arranged along the third direction DR3 may be provided. The first dielectric layer IL1 may be provided between the upper antenna patch 120 and the lower antenna patch 110. The lower antenna patch 110 may be provided between the first dielectric layer IL1 and the second dielectric layer IL2. Each of the first to fourth dielectric layers IL1, IL2, IL3, and IL4 may include a dielectric material. For example, each of the first to fourth dielectric layers IL1, IL2, IL3, and IL4 may include a ceramic-based dielectric material having a high dielectric constant and a low thermal expansion coefficient.

An X feed pad 211, the X feed line 221, a Y feed pad 212, and the Y feed line 222 may be provided between the second dielectric layer IL2 and the third dielectric layer IL3. Each of the X feed pad 211, the X feed line 221, the Y feed pad 212, and the Y feed line 222 may include an electrically conductive material. For example, each of the X feed pad 211, the X feed line 221, the Y feed pad 212, and the Y feed line 222 may include copper (Cu), aluminum (Al), gold (Au), or silver (Ag). For example, the X feed pad 211, the X feed line 221, the Y feed pad 212, and the Y feed line 222 may include substantially the same material. Although each of the X feed pad 211 and the Y feed pad 212 has a substantially circular shape, this is merely an example. A shape of each of the X feed pad 211 and the Y feed pad 212 may be determined as needed.

From a viewpoint along the third direction DR3, the X feed pad 211 may be spaced apart from the lower antenna patch 110 and the upper antenna patch 120 along a direction opposite to the first direction DR1. In other words, the X feed pad 211 may not overlap the lower antenna patch 110 and the upper antenna patch 120 along the third direction DR3. For example, from a viewpoint along the third direction DR3, the center of the X feed pad 211 and the center of the lower antenna patch 110 may be spaced apart from each other along the first direction DR1.

The x feed line 221 may extend from the X feed pad 211 along the first direction DR1. For example, the X feed line 221 may be a microstrip line. The X feed line 221 may overlap the lower antenna patch 110 along the third direction DR3. The X feed line 221 may transmit a high-frequency feed signal to the lower antenna patch 110, or may receive a signal from the lower antenna patch 110.

The Y feed pad 212 may be spaced apart from the X feed pad 211 along a fourth direction DR4. For example, the fourth direction DR4 may intersect the first direction DR1 and the second direction DR2, and may be perpendicular to the third direction DR3. From a viewpoint along the third direction DR3, the Y feed pad 212 may be spaced apart from the lower antenna patch 110 and the upper antenna patch 120 along a direction opposite to the second direction DR2. In other words, the Y feed pad 212 may not overlap the lower antenna patch 110 and the upper antenna patch 120 along the third direction DR3. For example, from a viewpoint along the third direction DR3, the center of the Y feed pad 212 and the center of the lower antenna patch 110 may be spaced apart from each other along the second direction DR2.

The Y feed line 222 may extend from the Y feed pad 212 along the second direction DR2. For example, the Y feed line 222 may be a microstrip line. The Y feed line 222 may overlap the lower antenna patch 110 along the third direction DR3. The Y feed line 222 may transmit a high-frequency feed signal to the lower antenna patch 110, or may receive a signal from the lower antenna patch 110. Accordingly, the stacked patch antenna 10 may have an indirect feeding structure in which indirect feeding is performed by the X feed line 221 and the Y feed line 222.

An upper ground plate GL1 may be provided between the second dielectric layer IL2 and the third dielectric layer IL3. The upper ground plate GL1 may be an antenna ground layer for the lower antenna patch 110 and the upper antenna patch 120. A ground voltage may be applied to the upper ground plate GL1. The upper ground plate GL1 may include an electrically conductive material. For example, the upper ground plate GL1 may include copper (Cu), aluminum (Al), gold (Au), or silver (Ag).

The upper ground plate GL1 may include an X upper hole 301 and a Y upper hole 302. The X upper hole 301 may include an X upper pad hole 301*a* and an X upper stub hole 301*b*. The X upper pad hole 301*a* may be spaced apart from the X feed pad 211 along the third direction DR3. The X upper pad hole 301*a* may have a circular shape. However, a shape of the X upper pad hole 301*a* is not limited. A shape of the X upper pad hole 301*a* may be determined as needed. The X upper stub hole 301*b* may protrude from the X upper pad hole 301*a*. For example, the X upper stub hole 301*b* may extend from the X upper pad hole 301*a* along a fifth direction DR5. For example, the fifth direction DR5 may intersect the first direction DR1 and the second direction DR2, and may be perpendicular to the third direction DR3.

The Y upper hole 302 may include a Y upper pad hole 302*a* and a Y upper stub hole 302*b*. The Y upper pad hole 302*a* may be spaced apart from the Y feed pad 212 along the third direction DR3. The Y upper pad hole 302*a* may have a circular shape. However, a shape of the Y upper pad hole 302*a* is not limited. A shape of the Y upper pad hole 302*a* may be determined as needed. The Y upper stub hole 302*b* may protrude from the Y upper pad hole 302*a*. For example, the Y upper stub hole 302*b* may extend from the Y upper pad hole 302*a* along the fifth direction DR5.

An X upper pad 311 and an X upper stub 321 may be provided in the X upper hole 301. Each of the X upper pad 311 and the X upper stub 321 may include an electrically conductive material. For example, each of the X upper pad 311 and the X upper stub 321 may include copper (Cu), aluminum (Al), gold (Au), or silver (Ag). A remaining portion of the X upper hole 301 where the X upper pad 311 and the X upper stub 321 are not provided may be filled with the third dielectric layer IL3. The X upper pad 311 may be provided in the X upper pad hole 301*a*. The X upper pad 311 may be spaced apart from the X feed pad 211 along the third direction DR3. The X upper pad 311 may have a smaller circular shape than the X upper pad hole 301*a*. However, a shape of the X upper pad 311 is not limited. A shape of the X upper pad 311 may be determined as needed. The X upper pad 311 may be spaced apart from the upper ground plate GL1.

The X upper stub 321 may protrude from the X upper pad 311. The X upper stub 321 may be provided in the X upper stub hole 301*b*. For example, the X upper stub 321 may extend from the X upper pad 311 along the fifth direction DR5, and may directly contact the upper ground plate GL1. In other words, one end from among both ends of the X upper stub 321 arranged along the fifth direction DR5 may contact the X upper pad 311, and the other end may contact the upper ground plate GL1. When a high-frequency electrical signal (or a high-frequency feed signal) is applied to the X upper stub 321, the X upper stub 321 may be an inductor that connects the X upper pad 311 to the upper ground plate GL1.

An X upper via 331 may be provided between the X upper pad 311 and the X feed pad 211. The X upper via 331 may include an electrically conductive material. For example, the X upper via 331 may include copper (Cu), aluminum (Al), gold (Au), or silver (Ag). The X upper via 331 may pass through the third dielectric layer IL3. The X upper via 331 may extend along the third direction DR3. The X upper via 331 may be electrically connected to the X upper pad 311 and the X feed pad 211. For example, one end from among both ends of the X upper via 331 arranged along the third direction DR3 may contact the X feed pad 211, and the other end may contact the X upper pad 311.

A Y upper pad 312 and a Y upper stub 322 may be provided in the Y upper hole 302. Each of the Y upper pad 312 and the Y upper stub 322 may include an electrically conductive material. For example, each of the Y upper pad 312 and the Y upper stub 322 may include copper (Cu), aluminum (Al), gold (Au), or silver (Ag). A remaining portion of the Y upper hole 302 where the Y upper pad 312 and the Y upper stub 322 are not provided may be filled with the third dielectric layer IL3. The Y upper pad 312 may be provided in the Y upper pad hole 302*a*. The Y upper pad 312 may be spaced apart from the Y feed pad 212 along the third direction DR3. The Y upper pad 312 may be spaced apart from the X upper pad 311 along the fourth direction DR4. The Y upper pad 312 may have a smaller circular shape than the Y upper pad hole 302*a*. However, a shape of the Y upper pad 312 is not limited. A shape of the Y upper pad 312 may be determined as needed. The Y upper pad 312 may be spaced apart from the upper ground plate GL1.

The Y upper stub 322 may protrude from the Y upper pad 312. The Y upper stub 322 may be provided in the Y upper stub hole 302*b*. For example, the Y upper stub 322 may extend from the Y upper pad 312 along the fifth direction DR5, and may directly contact the upper ground plate GL1. In other words, one end from among both ends of the Y upper stub 322 arranged along the fifth direction DR5 may contact the Y upper pad 312, and the other end may contact the upper ground plate GL1. When a high-frequency electrical signal (or a high-frequency feed signal) is applied to the Y upper stub 322, the Y upper stub 322 may be an inductor that connects the Y upper pad 312 to the upper ground plate GL1.

A Y upper via 332 may be provided between the Y upper pad 312 and the Y feed pad 212. The Y upper via 332 may include an electrically conductive material. For example, the Y upper via 332 may include copper (Cu), aluminum (Al), gold (Au), or silver (Ag). The Y upper via 332 may pass through the third dielectric layer IL3. The Y upper via 332 may extend along the third direction DR3. The Y upper via 332 may be electrically connected to the Y upper pad 312 and the Y feed pad 212. For example, one end from among both ends of the Y upper via 332 arranged along the third direction DR3 may contact the Y feed pad 212, and the other end may contact the Y upper pad 312. The Y upper via 332 may be spaced apart from the X upper via 331 along the fourth direction DR4.

A lower ground plate GL2 may be provided between the third dielectric layer IL3 and the fourth dielectric layer IL4. The lower ground plate GL2 may be a ground layer located around a microstrip line (not shown) for routing between adjacent stacked patch antennas when a plurality of stacked patch antennas are provided. A ground voltage may be applied to the lower ground plate GL2. The lower ground plate GL2 may include an electrically conductive material. For example, the lower ground plate GL2 may include copper (Cu), aluminum (Al), gold (Au), or silver (Ag).

The lower ground plate GL2 may include an X lower hole 401 and a Y lower hole 402. The X lower hole 401 may include an X lower pad hole 401*a*, a first X lower stub hole 401*b*1, and a second X lower stub hole 401*b*2. The X lower pad hole 401*a* may be spaced apart from the X upper pad hole 301 a along the third direction DR3. The X lower pad hole 401*a* may have a circular shape. However, a shape of the X lower pad hole 401*a* is not limited. A shape of the X lower pad hole 401*a* may be determined as needed.

The first X lower stub hole 401*b*1 may protrude from a side of the X lower pad hole 401*a*. For example, the first X lower stub hole 401*b*1 may extend from the X lower pad hole 401*a* along the fifth direction DR5. The second X lower stub hole 401*b*2 may protrude from the other side of the X lower pad hole 401*a*. For example, the second X lower stub hole 401*b*2 may extend from the X lower pad hole 401*a* along a direction opposite to the fifth direction DR5.

The Y lower hole 402 may include a Y lower pad hole 402*a*, a first Y lower stub hole 402*b*1, and a second Y lower stub hole 402*b*2. The Y lower pad hole 402*a* may be spaced apart from the Y upper pad hole 302*a* along the third direction DR3. The Y lower pad hole 402*a* may have a circular shape. However, a shape of the Y lower pad hole 402*a* is not limited. A shape of the Y lower pad hole 402*a* may be determined as needed.

The first Y lower stub hole 402*b*1 may protrude from a side of the Y lower pad hole 402*a*. For example, the first Y lower stub hole 402*b*1 may extend from the Y lower pad hole 402*a* along the fifth direction DR5. The second Y lower stub hole 402*b*2 may protrude from the other side of the Y lower pad hole 402*a*. For example, the second Y lower stub hole 402*b*2 may extend from the Y lower pad hole 402*a* along a direction opposite to the fifth direction DR5.

The X lower pad 411, the first X lower stub 421*a*, and the second X lower stub 421*b* may be provided in the X lower hole 401. Each of the X lower pad 411, the first X lower stub 421*a*, and the second X lower stub 421*b* may include an electrically conductive material. For example, each of the X lower pad 411, the first X lower stub 421*a*, and the second X lower stub 421*b* may include copper (Cu), aluminum (Al), gold (Au), or silver (Ag). A remaining portion of the X lower hole 401 where the X lower pad 411, the first X lower stub 421*a*, and the second X lower stub 421*b* are not provided may be filled with the fourth dielectric layer IL4.

The X lower pad 411 may be provided in the X lower pad hole 401*a*. The X lower pad 411 may be spaced apart from the X feed pad 211 along the third direction DR3. The X lower pad 411 may have a smaller circular shape than the X lower pad hole 401*a*. However, a shape of the X lower pad 411 is not limited. A shape of the X lower pad 411 may be determined as needed. The X lower pad 411 may be spaced apart from the lower ground plate GL2.

The first X lower stub 421*a* may protrude from a side of the X lower pad 411. The first X lower stub 421*a* may be provided in the first X lower stub hole 401*b*1. For example, the first X lower stub 421*a* may extend from the X lower pad 411 along the fifth direction DR5. The first X lower stub 421*a* may be spaced apart from the lower ground plate GL2. When a high-frequency electrical signal (or a high-frequency feed signal) is applied to the first X lower stub 421*a*, the first X lower stub 421*a* and the lower ground plate GL2 may constitute a capacitor used for impedance matching.

The second X lower stub 421*b* may protrude from the other side of the X lower pad 411. The second X lower stub 421*b* may be provided in the second X lower stub hole 401*b*2. For example, the second X lower stub 421*b* may extend from the X lower pad 411 along a direction opposite to the fifth direction DR5. The second X lower stub 421*b* may be spaced apart from the lower ground plate GL2. The second X lower stub 421*b* have a different length from the first X lower stub 421*a*. For example, the second X lower stub 421*b* may be shorter than the first X lower stub 421*a*. However, the present disclosure is not limited thereto. In another example, a length of the second X lower stub 421*b* may be substantially equal to or greater than a length of the first X lower stub 421*a*. When a high-frequency electrical signal (or a high-frequency feed signal) is applied to the second X lower stub 421*b*, the second X lower stub 421*b* and the lower ground plate GL2 may constitute a capacitor used for impedance matching.

An X lower via 431 may be provided between the X lower pad 411 and the X upper pad 311. The X lower via 431 may include an electrically conductive material. For example, the X lower via 431 may include copper (Cu), aluminum (Al), gold (Au), or silver (Ag). The X lower via 431 may pass through the fourth dielectric layer IL4. The X lower via 431 may extend along the third direction DR3. The X lower via 431 may be electrically connected to the X lower pad 411 and the X upper pad 311. For example, one end from among both ends of the X lower via 431 arranged along the third direction DR3 may contact the X upper pad 311, and the other end may contact the X lower pad 411.

A Y lower pad 412, a first Y lower stub 422*a*, and a second Y lower stub 422*b* may be provided in the Y lower hole 402. Each of the Y lower pad 412, the first Y lower stub 422*a*, and the second Y lower stub 422*b* may include an electrically conductive material. For example, each of the Y lower pad 412, the first Y lower stub 422*a*, and the second Y lower stub 422*b* may include copper (Cu), aluminum (Al), gold (Au), or silver (Ag). A remaining portion of the Y lower hole 402 where the Y lower pad 412, the first Y lower stub 422*a*, and the second Y lower stub 422*b* are not provided may be filled with the fourth dielectric layer IL4.

The Y lower pad 412 may be provided in the Y lower pad hole 402*a*. The Y lower pad 412 may be spaced apart from the Y feed pad 212 along the third direction DR3. The Y lower pad 412 may be spaced apart from the X lower pad 411 along the fourth direction DR4. The Y lower pad 412 may have a smaller circular shape than the Y lower pad hole 402*a*. However, a shape of the Y lower pad 412 is not limited. A shape of the Y lower pad 412 may be determined as needed. The Y lower pad 412 may be spaced apart from the lower ground plate GL2.

The first Y lower stub 422*a* may protrude from a side of the Y lower pad 412. The first Y lower stub 422*a* may be provided in the first Y lower stub hole 402*b*1. For example, the first Y lower stub 422*a* may extend from the Y lower pad 412 along the fifth direction DR5. The first Y lower stub 422*a* may be spaced apart from the lower ground plate GL2. When a high-frequency electrical signal (or a high-frequency feed signal) is applied to the first Y lower stub 422*a*, the first Y lower stub 422*a* and the lower ground plate GL2 may constitute a capacitor used for impedance matching.

The second Y lower stub 422*b* may protrude from the other side of the Y lower pad 412. The second Y lower stub 422*b* may be provided in the second Y lower stub hole 402*b*2. For example, the second Y lower stub 422*b* may extend from the Y lower pad 412 along a direction opposite to the fifth direction DR5. The second Y lower stub 422*b* may be spaced apart from the lower ground plate GL2. The second Y lower stub 422*b* may have a different length from the first Y lower stub 422*a*. For example, the second Y lower stub 422*b* may be shorter than the first Y lower stub 422*a*. However, the present disclosure is not limited thereto. In another embodiment, a length of the second Y lower stub 422*b* may be substantially equal to or greater than a length of the first Y lower stub 422*a*. When a high-frequency electrical signal (or a high-frequency feed signal) is applied to the second Y lower stub 422*b*, the second Y lower stub 422*b* and the lower ground plate GL2 may constitute a capacitor used for impedance matching.

A Y lower via 432 may be provided between the Y lower pad 412 and the Y upper pad 312. The Y lower via 432 may include an electrically conductive material. For example, the Y lower via 432 may include copper (Cu), aluminum (Al), gold (Au), or silver (Ag). The Y lower via 432 may pass through the fourth dielectric layer IL4. The Y lower via 432 may extend along the third direction DR3. The Y lower via 432 may be electrically connected to the Y lower pad 412 and the Y upper pad 312. For example, one end from among both ends of the Y lower via 432 arranged along the third direction DR3 may contact the Y upper pad 312, and the other end may contact the Y lower pad 412. The Y lower via 432 may be spaced apart from the X lower via 431 along the fourth direction DR4.

In a stacked patch antenna, as a size difference between an upper antenna patch and a lower antenna patch increases, a bandwidth of the stacked patch antenna increases. However, at the same, the risk of impedance mismatch due to frequency selectivity and parasitic components occurring in a feeding structure may also increase. Accordingly, a size of the upper antenna patch may not be 15% or more greater than a size of the lower antenna patch.

The stacked patch antenna 10 of the present disclosure may include at least one of the X upper stub 321, the Y upper stub 322, the first X lower stub 421*a*, the second X lower stub 421*b*, the first Y lower stub 422*a*, and the second Y lower stub 422*b* for impedance matching. Impedance matching may be performed even when a size of the upper antenna patch 120 along a longitudinal direction (the first direction DR1) of the X feed line 221 or a longitudinal direction (the second direction DR2) of the Y feed line 222 is 15% or more greater than a size of the lower antenna patch 110. For example, a size of the upper antenna patch 120 may be 20% or more greater than a size of the lower antenna patch 110. Accordingly, the stacked patch antenna 10 having a wide bandwidth may be provided.

Figure 6:
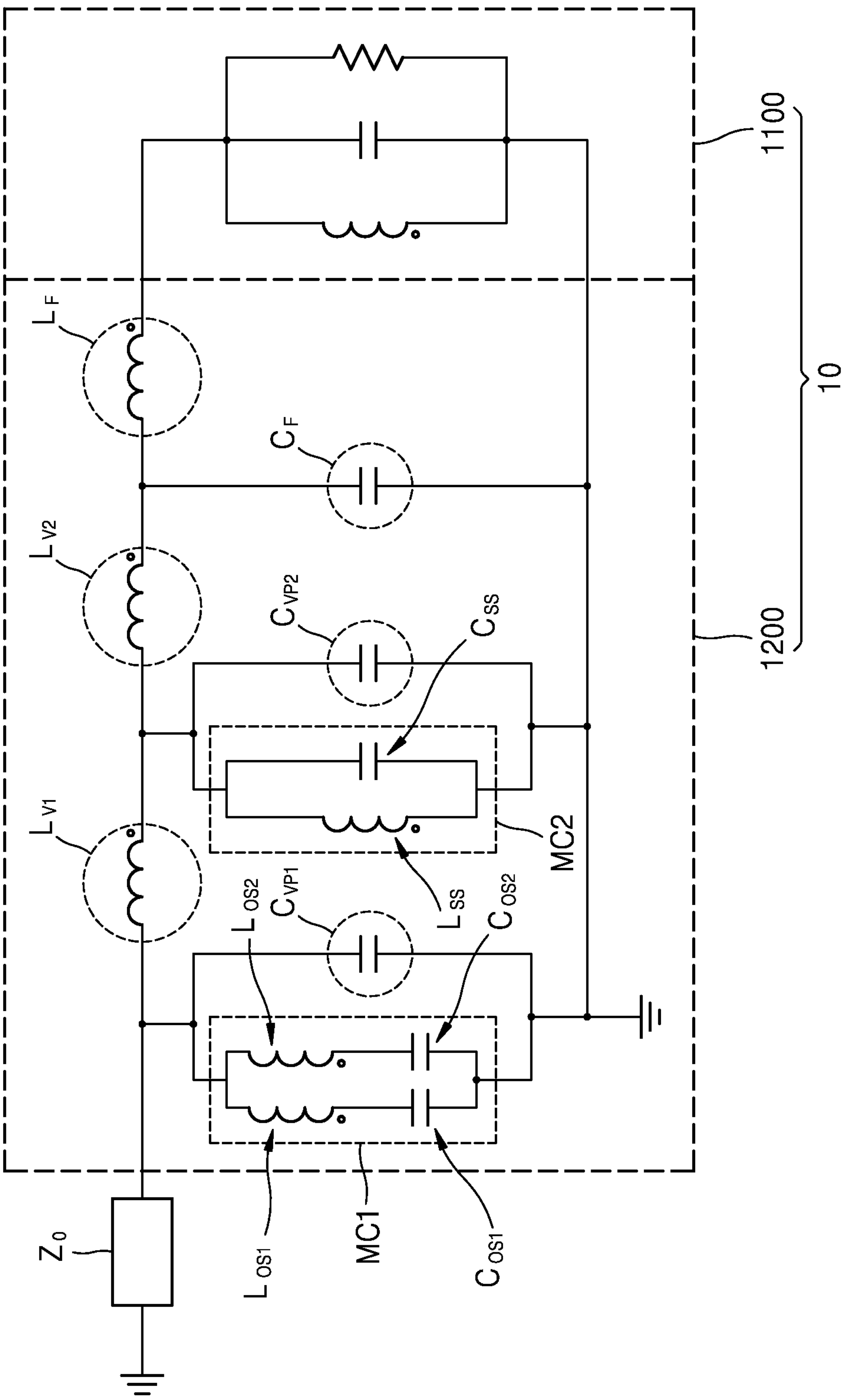
FIG. 6 is an equivalent circuit diagram illustrating a portion of the stacked patch antenna when a high-frequency feed signal is applied to the stacked patch antenna described with reference to FIGS. 1 to 5.

FIG. 6 is an equivalent circuit diagram illustrating a portion of the stacked patch antenna when a high-frequency feed signal is applied to the stacked patch antenna described with reference to FIGS. 1 to 5. In detail, FIG. 6 is an equivalent circuit diagram illustrating the upper antenna patch 120, the lower antenna patch 110, the X feed line 221, the X feed pad 211, the upper ground plate GL1, the X upper pad 311, the X upper stub 321, the lower ground plate GL2, the X lower pad 411, the first X lower stub 421*a*, and the second X lower stub 421*b*, or an equivalent circuit diagram illustrating the upper antenna patch 120, the lower antenna patch 110, the Y feed line 222, the Y feed pad 212, the upper ground plate GL1, the Y upper pad 312, the Y upper stub 322, the lower ground plate GL2, the Y lower pad 412, the first Y lower stub 422*a*, and the second Y lower stub 422*b*.

Referring to FIG. 6, the stacked patch antenna 10 may include an antenna patch area 1100 and a feed area 1200. The antenna patch area 1100 may be an equivalent circuit corresponding to the lower antenna patch 110 and the upper antenna patch 120. The stacked patch antenna 10 may be electrically connected to a load impedance $Z_0$ outside the stacked patch antenna 10.

The X feed line 221 and the Y feed line 222 may be inductors. $L_F$ may indicate an inductor formed by the X feed line 221 or the Y feed line 222.

The X feed pad 211 and the upper ground plate GL1 may constitute a capacitor. The Y feed pad 212 and the upper ground plate GL1 may constitute a capacitor. CF may indicate a capacitor formed by the X feed pad 211 and the upper ground plate GL1 or a capacitor formed by the Y feed pad 212 and the upper ground plate GL1.

The X upper via 331 and the Y upper via 332 may be inductors. $L_{V2}$ may indicate an inductor formed by the X upper via 331 or the Y upper via 332.

The X upper pad 311 and the upper ground plate GL1 may constitute a capacitor. The Y upper pad 312 and the upper ground plate GL1 may constitute a capacitor. $C_{VP2}$ may indicate a capacitor formed by the X upper pad 311 and the upper ground plate GL1 or a capacitor formed by the Y upper pad 312 and the upper ground plate GL1.

The X lower via 431 and the Y lower via 432 may be inductors. $L_{V1}$ may indicate an inductor formed by the X lower via 431 or the Y lower via 432.

The X lower pad 411 and the lower ground plate GL2 may constitute a capacitor. The Y lower pad 412 and the lower ground plate GL2 may constitute a capacitor. $C_{VP1}$ may indicate a capacitor formed by the X lower pad 411 and the lower ground plate GL2 or a capacitor formed by the Y lower pad 412 and the lower ground plate GL2.

The X upper stub 321 and the upper ground plate GL1 may constitute a capacitor used for impedance matching. The Y upper stub 322 and the upper ground plate GL1 may constitute a capacitor used for impedance matching. $C_{SS}$ may indicate a capacitor formed by the X upper stub 321 and the upper ground plate GL1 or a capacitor formed by the Y upper stub 322 and the upper ground plate GL1.

$L_F$, $L_{V1}$, $C_{VP2}$, $L_{V2}$, and $C_{VP1}$ are unintended factors in designing a stacked patch antenna, which may cause impedance mismatch.

The X upper stub 321 and the Y upper stub 322 may be inductors. $L_{SS}$ may indicate an inductor formed by the X upper stub 321 and the Y upper stub 322. $L_{SS}$ and $C_{SS}$ may be connected in parallel.

The first X lower stub 421*a* and the lower ground plate GL2 may constitute a capacitor used for impedance matching. The first Y lower stub 422*a* and the lower ground plate GL2 may constitute a capacitor used for impedance matching. $C_{OS1}$ may indicate a capacitor formed by the first X lower stub 421*a* and the lower ground plate GL2 or a capacitor formed by the first Y lower stub 422*a* and the lower ground plate GL2.

The first X lower stub 421*a* and the first Y lower stub 422*a* may constitute an inductor used for impedance matching. $L_{OS1}$ may indicate an inductor formed by the first X lower stub 421*a* or the first Y lower stub 422*a*. $L_{OS1}$ and $C_{OS1}$ may be connected in series.

The second X lower stub 421*b* and the lower ground plate GL2 may constitute a capacitor used for impedance matching. The second Y lower stub 422*b* and the lower ground plate GL2 may constitute a capacitor used for impedance matching. $C_{OS2}$ may indicate a capacitor formed by the second X lower stub 421*b* and the lower ground plate GL2 or a capacitor formed by the second Y lower stub 422*b* and the lower ground plate GL2.

The second X lower stub 421*b* and the second Y lower stub 422*b* may constitute an inductor used for impedance matching. $L_{OS2}$ may indicate an inductor formed by the second X lower stub 421*b* or the second Y lower stub 422*b*. $L_{OS2}$ and $C_{OS2}$ may be connected in series. $L_{OS1}$, $C_{OS1}$, $L_{OS2}$, and $C_{OS2}$ may be a first matching element MC1. $L_{SS}$ and $C_{SS}$ may be a second matching element MC2.

The first matching element MC1 and the second matching element MC2 may perform impedance matching between the load impedance $Z_0$ and an impedance of the stacked patch antenna 10. Even when a size difference between the upper antenna patch 120 and the lower antenna patch 110 in a longitudinal direction (the first direction DR1) of the X feed line 221 or a longitudinal direction (the second direction DR2) of the Y feed line 222 is large, impedance matching may be performed by using the first matching element MC1 and the second matching element MC2. Accordingly, the stacked patch antenna 10 having wide bandwidth characteristics may be provided.

Figure 7:
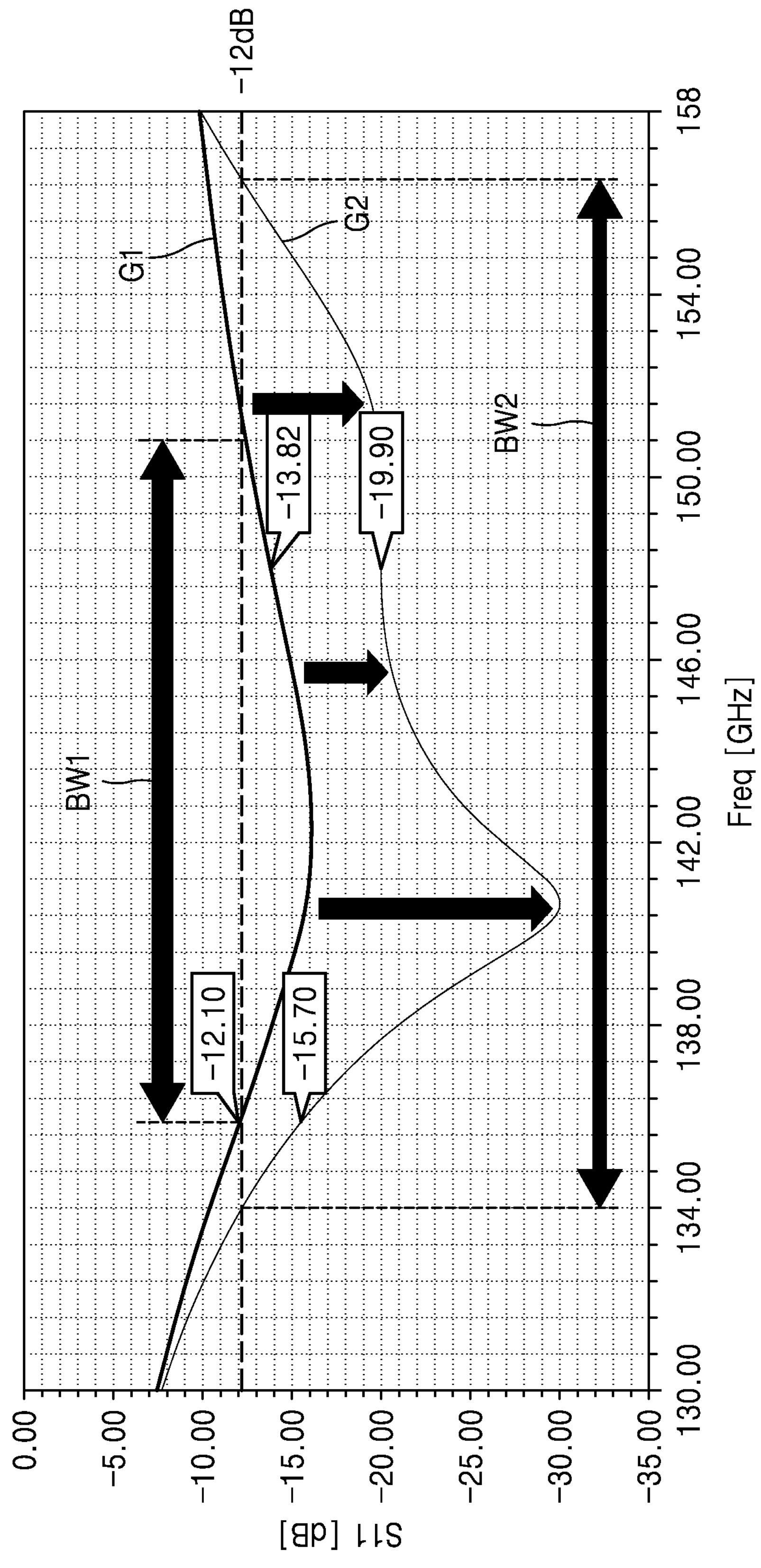
FIG. 7 is a graph illustrating reflection characteristics of a stacked patch antenna according to sizes of an upper antenna patch and a lower antenna patch.

FIG. 7 is a graph illustrating reflection characteristics of a stacked patch antenna according to sizes of an upper antenna patch and a lower antenna patch.

FIG. 7 shows a first reflection characteristic graph G1 and a second reflection characteristic graph G2. In the first reflection characteristic graph G1 and the second reflection characteristic graph G2, a distance between two frequencies for which an S parameter Su is −12 decibels (dB) may be a bandwidth.

The first reflection characteristic graph G1 may be a reflection characteristic graph of a stacked patch antenna not including the stubs 321, 322, 421*a*, 421*b*, 422*a*, 422*b*, unlike those described with reference to FIGS. 1 to 5. A size of an upper antenna patch was 2% greater than a size of a lower antenna patch. A first bandwidth BW1 according to the first reflection characteristic graph G1 was about 15.9 GHz.

The second reflection characteristic graph G2 is a reflection characteristic graph of the stacked patch antenna 10 described with reference to FIGS. 1 to 5. A size of an upper antenna patch was 25% greater than a size of a lower antenna patch. A second bandwidth BW2 according to the second reflection characteristic graph G2 was about 22.74 GHz.

According to the present disclosure, because impedance matching may be performed even when the upper antenna patch 120 and the lower antenna patch 110 have a large size difference along a longitudinal direction (the first direction DR1) of the X feed line 221 or a longitudinal direction (the second direction DR2) of the Y feed line 222, the stacked patch antenna 10 having an increased bandwidth may be provided.

Figure 8:
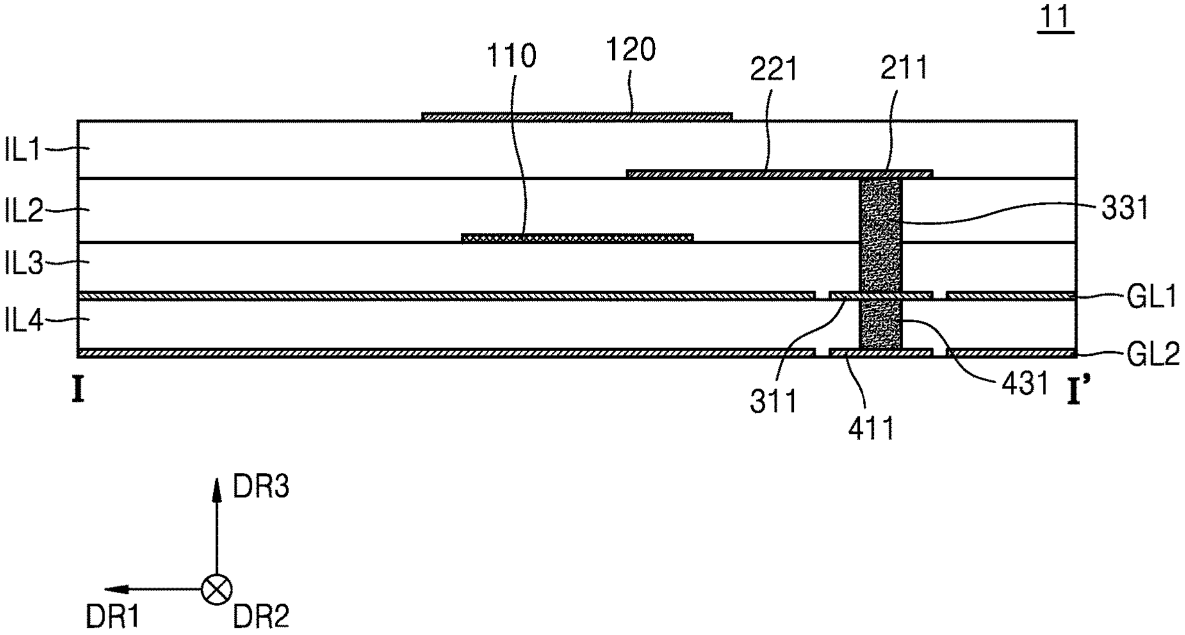
FIG. 8 is a cross-sectional view illustrating a stacked patch antenna according to an exemplary embodiment, taken along line I-I' of FIG. 1.
Figure 9:
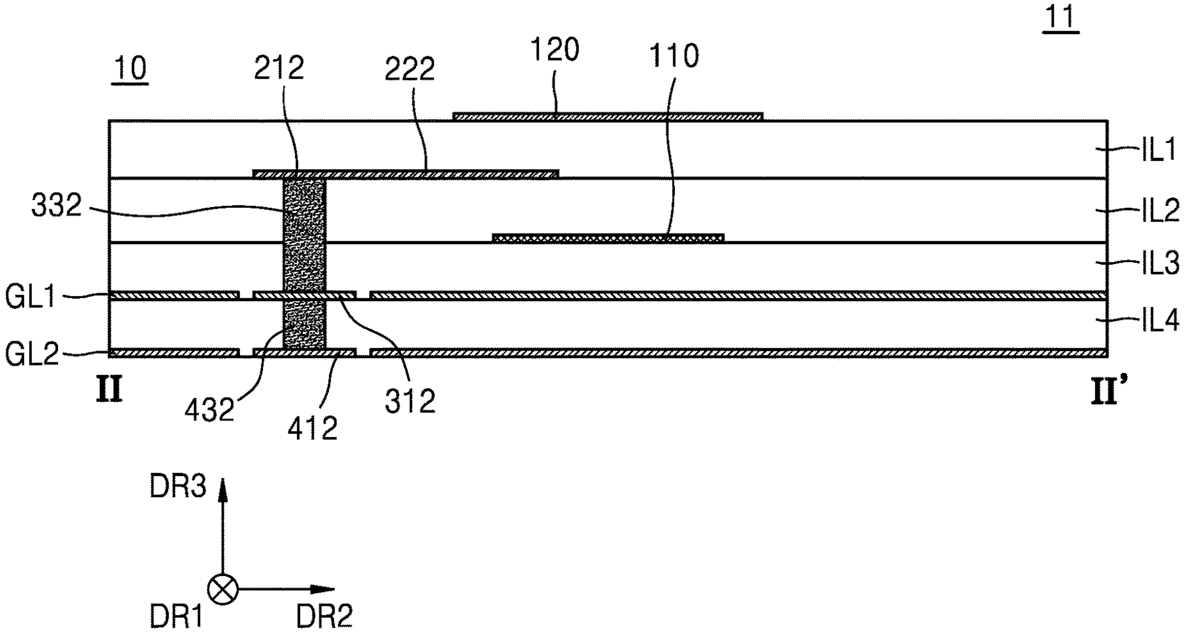
FIG. 9 is a cross-sectional view illustrating the stacked patch antenna of FIG. 8, taken along line II-II' of FIG. 1.

FIG. 8 is a cross-sectional view illustrating a stacked patch antenna according to an exemplary embodiment, taken along line I-I' of FIG. 1. FIG. 9 is a cross-sectional view illustrating the stacked patch antenna of FIG. 8, taken along line II-II' of FIG. 1. For description brevity, the present disclosure may be described focusing on a difference from those described with reference to FIGS. 1 to 5.

Referring to FIGS. 8 and 9, the X feed line 221 and the Y feed line 222 may be provided between the lower antenna patch 110 and the upper antenna patch 120. The lower antenna patch 110 may be provided between the third dielectric layer IL3 and the second dielectric layer IL2. The X feed line 221 and the Y feed line 222 may be provided between the second dielectric layer IL2 and the first dielectric layer IL1. The X feed pad 211 may be provided between the second dielectric layer IL2 and the first dielectric layer IL1, and may be electrically connected to the X feed line 221. The Y feed pad 212 may be provided between the second dielectric layer IL2 and the first dielectric layer IL1, and may be electrically connected to the Y feed line 222.

The X upper via 331 may extend from the X upper pad 311 along the third direction DR3, may pass through the third dielectric layer IL3 and the second dielectric layer IL2, and may contact the X feed pad 211. The Y upper via 332 may extend from the Y upper pad 312 along the third direction DR3, may pass through the third dielectric layer IL3 and the second dielectric layer IL2, and may contact the Y feed pad 212.

According to the present disclosure, because impedance matching may be performed even when a size of the upper antenna patch 120 along a longitudinal direction (the first direction DR1) of the X feed line 221 or a longitudinal direction (the second direction DR2) of the Y feed line 222 is 15% or more greater than a size of the lower antenna patch 110, a stacked patch antenna 11 having a wide bandwidth may be provided.

Figure 10:
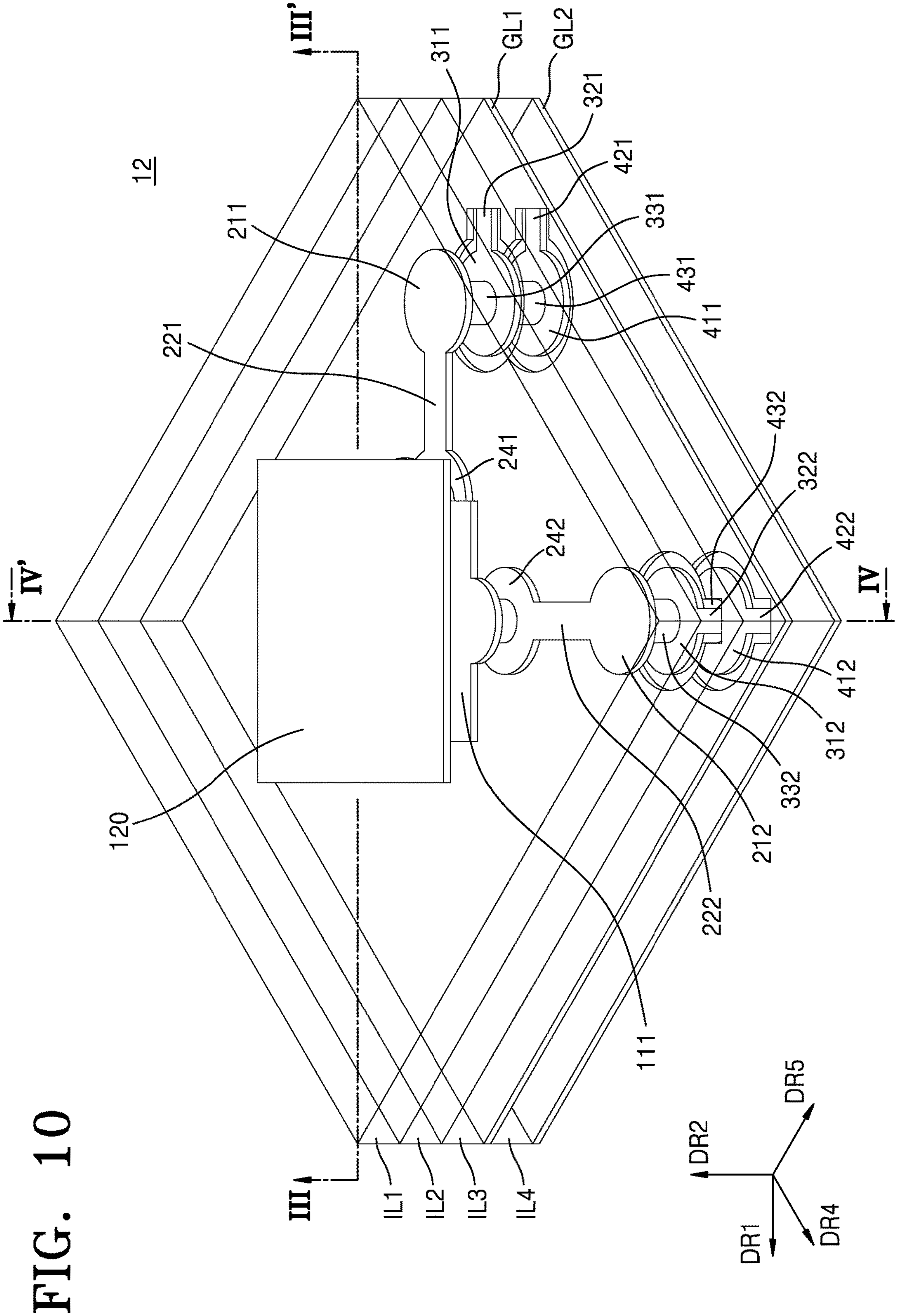
FIG. 10 is a perspective view illustrating a stacked patch antenna according to an exemplary embodiment.
Figure 11:
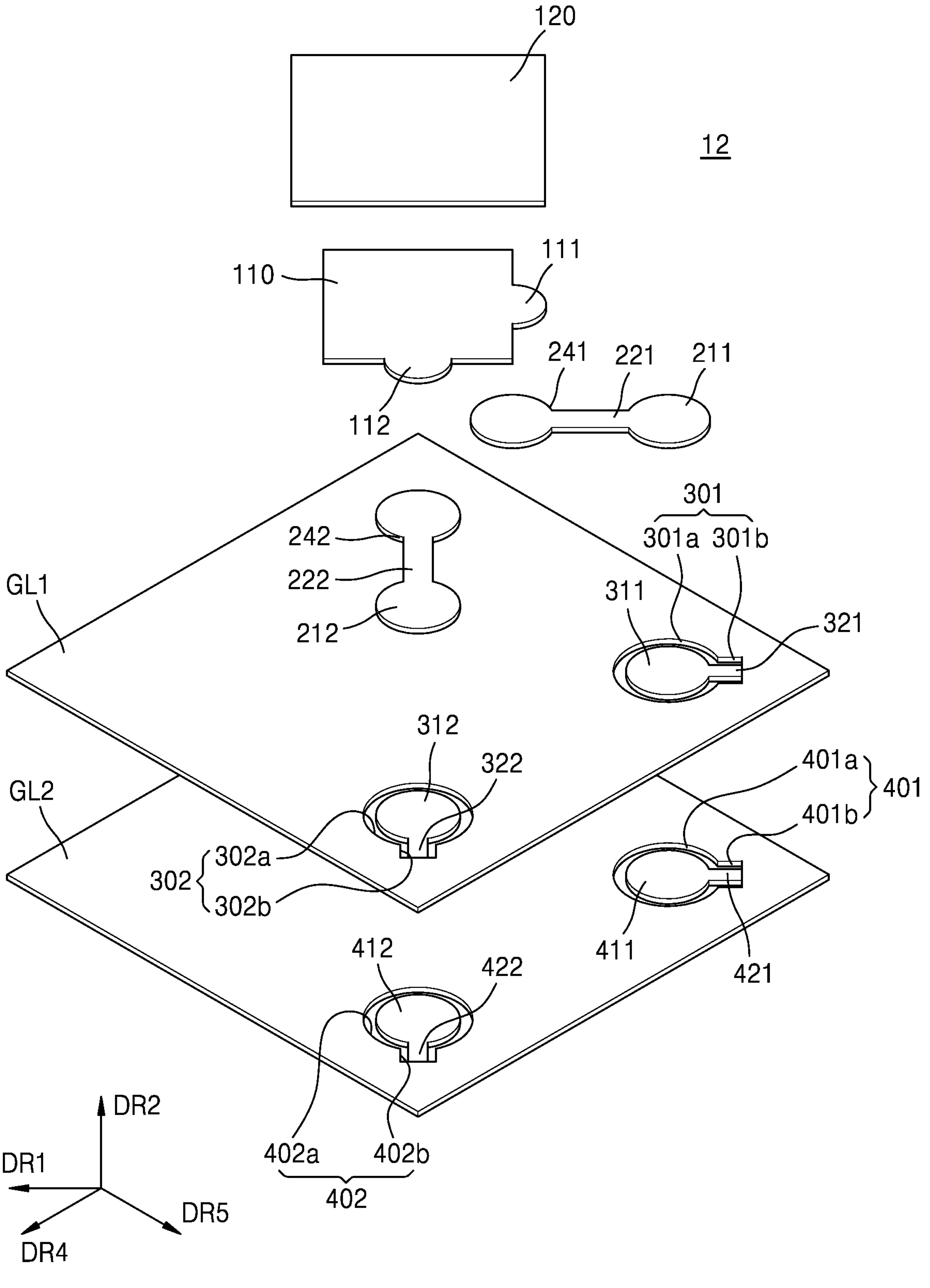
FIG. 11 is an exploded perspective view illustrating the stacked patch antenna of FIG. 10.
Figure 12:
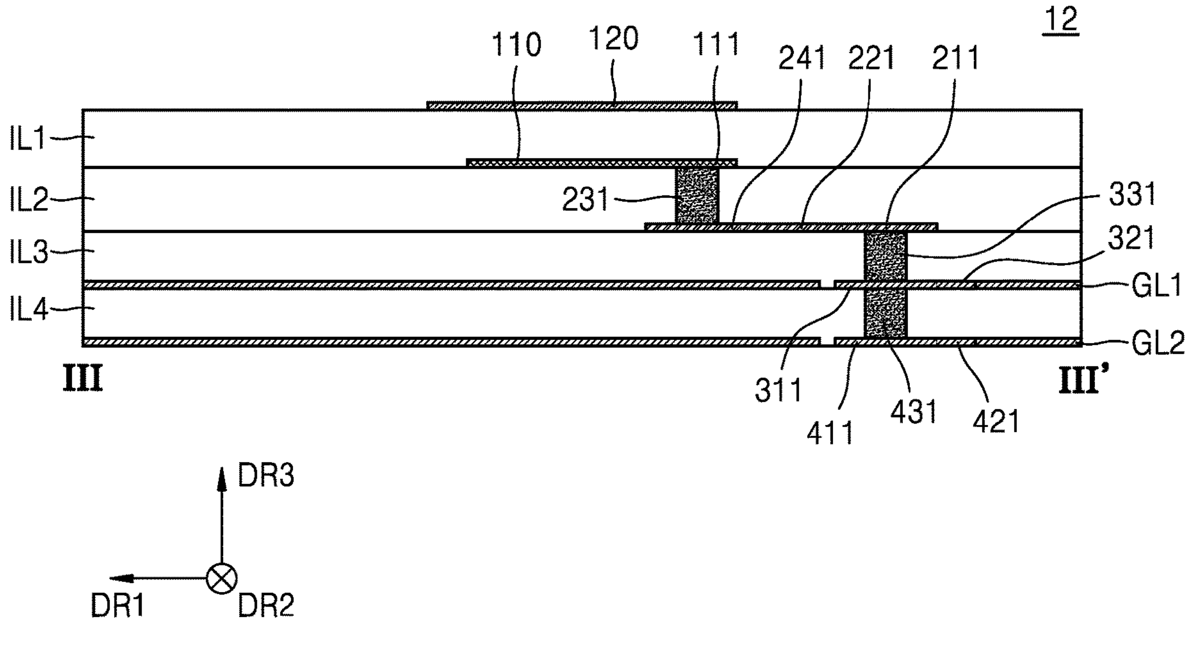
FIG. 12 is a cross-sectional view taken along line III-III' of the stacked patch antenna of FIG. 10.
Figure 13:
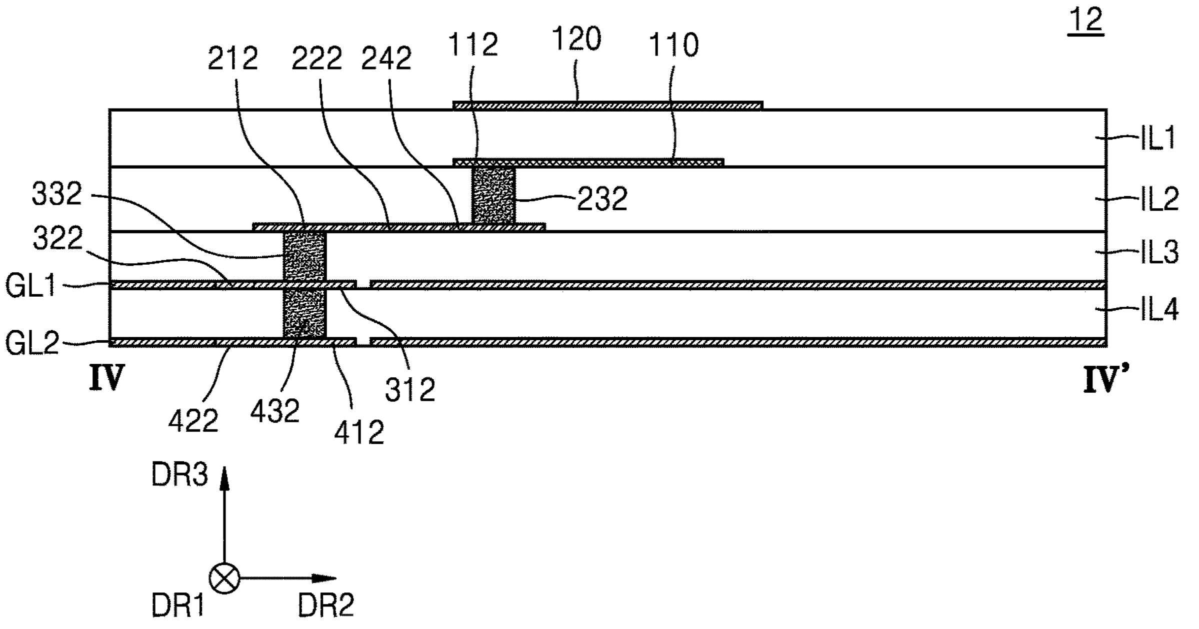
FIG. 13 is a cross-sectional view taken along line IV-IV' of the stacked patch antenna of FIG. 10.

FIG. 10 is a perspective view illustrating a stacked patch antenna according to an exemplary embodiment. FIG. 11 is an exploded perspective view illustrating the stacked patch antenna of FIG. 10. FIG. 12 is a cross-sectional view taken along line III-III' of the stacked patch antenna of FIG. 10. FIG. 13 is a cross-sectional view taken along line IV-IV' of the stacked patch antenna of FIG. 10. For description brevity, the present disclosure will be described focusing a difference from those described with reference to FIGS. 1 to 5.

Referring to FIGS. 10 to 13, a stacked patch antenna 12 may be provided. The stacked patch antenna 12 may have a direct feeding structure in which the lower antenna patch 110 is directly fed.

An X protruding pad 111 may be provided on a first side surface of the lower antenna patch 110. The first side surface may extend along the second direction DR2, and may face a direction opposite to the first direction DR1. The X protruding pad 111 may protrude from the first side surface along a direction opposite to the first direction DR1. Although the X protruding pad 111 has a semicircular shape, this is merely an example. A shape of the X protruding pad 111 may be determined as needed. The X protruding pad 111 may include an electrically conductive material. For example, the X protruding pad 111 may include copper (Cu), aluminum (Al), gold (Au), or silver (Ag). In an example, the X protruding pad 111 may include substantially the same material as the lower antenna patch 110. The X protruding pad 111 and the lower antenna patch 110 may contact each other. In an example, the X protruding pad 111 and the lower antenna patch 110 may form a single structure. For example, the X protruding pad 111 and the lower antenna patch 110 may be connected to each other without a boundary therebetween.

A Y protruding pad 112 may be provided on a second side surface of the lower antenna patch 110. The second side surface may extend along the second direction DR2, and may face a direction opposite to the second direction DR2. The Y protruding pad 112 may protrude from the second side surface along a direction opposite to the first direction DR1. Although the Y protruding pad 112 has a semicircular shape, this is merely an example. A shape of the Y protruding pad 112 may be determined as needed. The Y protruding pad 112 may include an electrically conductive material. For example, the Y protruding pad 112 may include copper (Cu), aluminum (Al), gold (Au), or silver (Ag). In an example, the Y protruding pad 112 may include substantially the same material as the lower antenna patch 110. The Y protruding pad 112 and the lower antenna patch 110 may contact each other. In an example, the Y protruding pad 112 and the lower antenna patch 110 may form a single structure. For example, the Y protruding pad 112 and the lower antenna patch 110 may be connected to each other without a boundary therebetween.

An X connection pad 241 and a Y connection pad 242 may be provided between the second dielectric layer IL2 and the third dielectric layer IL3. Each of the X connection pad 241 and the Y connection pad 242 may include an electrically conductive material. For example, each of the X connection pad 241 and the Y connection pad 242 may include copper (Cu), aluminum (Al), gold (Au), or silver (Ag). In an example, the X connection pad 241 and the Y connection pad 242 may include substantially the same material as the X feed pad 211, the X feed line 221, the Y feed pad 212, and the Y feed line 222. Although each of the X connection pad 241 and the Y connection pad 242 has a substantially circular shape, this is merely an example. A shape of each of the X connection pad 241 and the Y connection pad 242 may be determined as needed.

The X feed pad 211, the X feed line 221, and the X connection pad 241 may be arranged along the first direction DR1. The X connection pad 241 may be electrically connected to the X feed line 221. The X feed pad 211 may contact one end of the X feed line 221 along the first direction DR1, and the X connection pad 241 may contact the other end of the X feed line along the first direction DR1. In an example, the X feed pad 211, the X feed line 221, and the X connection pad 241 may form a single structure. For example, the X feed pad 211, the X feed line 221, and the X connection pad 241 may be connected to each other without a boundary therebetween. The X connection pad 241 may overlap the lower antenna patch 110 and the X protruding pad 111 along the third direction DR3.

An X connection via 231 may be provided between the X connection pad 241 and the lower antenna patch 110. The X connection via 231 may include an electrically conductive material. For example, the X connection via 231 may include copper (Cu), aluminum (Al), gold (Au), or silver (Ag). The X connection via 231 may pass through the second dielectric layer IL2. The X connection via 231 may extend from the X connection pad 241 along the third direction DR3. The X connection via 231 may be electrically connected to the X connection pad 241 and the lower antenna patch 110. One end of the X connection via 231 along the third direction DR3 may contact the X connection pad 241. The other end of the X connection via 231 along the third direction DR3 may contact at least one of the lower antenna patch 110 and the X protruding pad 111.

The Y feed pad 212, the Y feed line 222, and the Y connection pad 242 may be arranged along the second direction DR2. The Y connection pad 242 may be electrically connected to the Y feed line 222. The Y feed pad 212 may contact one end of the Y feed line 222 along the second direction DR2 and the Y connection pad 242 may contact the other end of the Y feed line 222 along the second direction DR2. In an example, the Y feed pad 212, the Y feed line 222, and the Y connection pad 242 may form a single structure. For example, the Y feed pad 212, the Y feed line 222, and the Y connection pad 242 may be connected to each other without a boundary therebetween. The Y connection pad 242 may overlap the lower antenna patch 110 and the Y protruding pad 112 along the third direction DR3.

A Y connection via 232 may be provided between the Y connection pad 242 and the lower antenna patch 110. The Y connection via 232 may include an electrically conductive material. For example, the Y connection via 232 may include copper (Cu), aluminum (Al), gold (Au), or silver (Ag). The Y connection via 232 may pass through the second dielectric layer IL2. The Y connection via 232 may extend from the Y connection pad 242 along the third direction DR3. The Y connection via 232 may be electrically connected to the Y connection pad 242 and the lower antenna patch 110. One end of the Y connection via 232 along the third direction DR3 may contact the Y connection pad 242. The other end of the Y connection via 232 along the third direction DR3 may contact at least one of the lower antenna patch 110 and the Y protruding pad 112.

The upper ground plate GL1 may include the X upper hole 301 and the Y upper hole 302. The X upper hole 301 may include the X upper pad hole 301*a* and the X upper stub hole 301*b*. The X upper stub hole 301*b* may protrude from the X upper pad hole 301*a* in a direction opposite to the first direction DR1. The Y upper hole 302 may include the Y upper pad hole 302*a* and the Y upper stub hole 302*b*. The Y upper stub hole 302*b* may protrude from the Y upper pad hole 302*a* in a direction opposite to the second direction DR2.

The X upper stub 321 may be provided in the X upper stub hole 301*b*. Unlike those described with reference to FIGS. 1 to 5, the X upper stub 321 may extend from the X upper pad 311 along a direction opposite to the first direction DR1, and may directly contact the upper ground plate GL1. In other words, one end from among both ends of the X upper stub 321 arranged along the first direction DR1 may contact the X upper pad 311, and the other end may contact the upper ground plate GL1. When a high-frequency electrical signal (or a high-frequency feed signal) is applied to the X upper stub 321, the X upper stub 321 and the upper ground plate GL1 may constitute a capacitor used for impedance matching.

The Y upper stub 322 may be provided in the Y upper stub hole 302*b*. Unlike those described with reference to FIGS. 1 to 5, the Y upper stub 322 may extend from the Y upper pad 312 along a direction opposite to the second direction DR2, and may directly contact the upper ground plate GL1. In other words, one end from among both ends of the Y upper stub 322 arranged along the second direction DR2 may contact the Y upper pad 312, and the other end may contact the upper ground plate GL1. When a high-frequency electrical signal (or a high-frequency feed signal) is applied to the Y upper stub 322, the Y upper stub 322 and the upper ground plate GL1 may constitute a capacitor used for impedance matching.

The lower ground plate GL2 may include the X lower hole 401 and the Y lower hole 402. The X lower hole 401 may include the X lower pad hole 401*a* and an X lower stub hole 401*b*. The X lower stub hole 401*b* may protrude from the X lower pad hole 401*a* along a direction opposite to the first direction DR1. The Y lower hole 402 may include the Y lower pad hole 402*a* and a Y lower stub hole 402*b*. The Y lower stub hole 402*b* may protrude from the Y lower pad hole 402*a* along a direction opposite to the second direction DR2.

An X lower stub 421 may be provided in the X lower stub hole 401*b*. The X lower stub 421 may extend from the X lower pad 411 along a direction opposite to the first direction DR1, and may directly contact the lower ground plate GL2. In other words, one end from among both ends of the X lower stub 421 arranged along the first direction DR1 may contact the X lower pad 411, and the other end may contact the lower ground plate GL2. When a high-frequency electrical signal (or a high-frequency feed signal) is applied to the X lower stub 421, the X lower stub 421 and the upper ground plate GL1 may constitute a capacitor used for impedance matching.

A Y lower stub 422 may be provided in the Y lower stub hole 402*b*. The Y lower stub 422 may extend from the Y lower pad 412 along a direction opposite to the second direction DR2, and may directly contact the lower ground plate GL2. In other words, one end from among both ends of the Y lower stub 422 arranged along the second direction DR2 may contact the Y lower pad 412, and the other end may contact the lower ground plate GL2. When a high-frequency electrical signal (or a high-frequency feed signal) is applied to the Y lower stub 422, the Y lower stub 422 and the upper ground plate GL2 may constitute a capacitor used for impedance matching.

The stacked patch antenna 12 of the present disclosure may include at least one of the X upper stub 321, the Y upper stub 322, the X lower stub 421, and the Y lower stub 422 for impedance matching. Accordingly, because impedance matching may be performed even when a size of the upper antenna patch 120 along a longitudinal direction (the first direction DR1) of the X feed line 221 or a longitudinal direction (the second direction DR2) of the Y feed line 222 is 15% or more greater than a size of the lower antenna patch 110, the stacked patch antenna 12 having a wide bandwidth may be provided.

Figure 14:
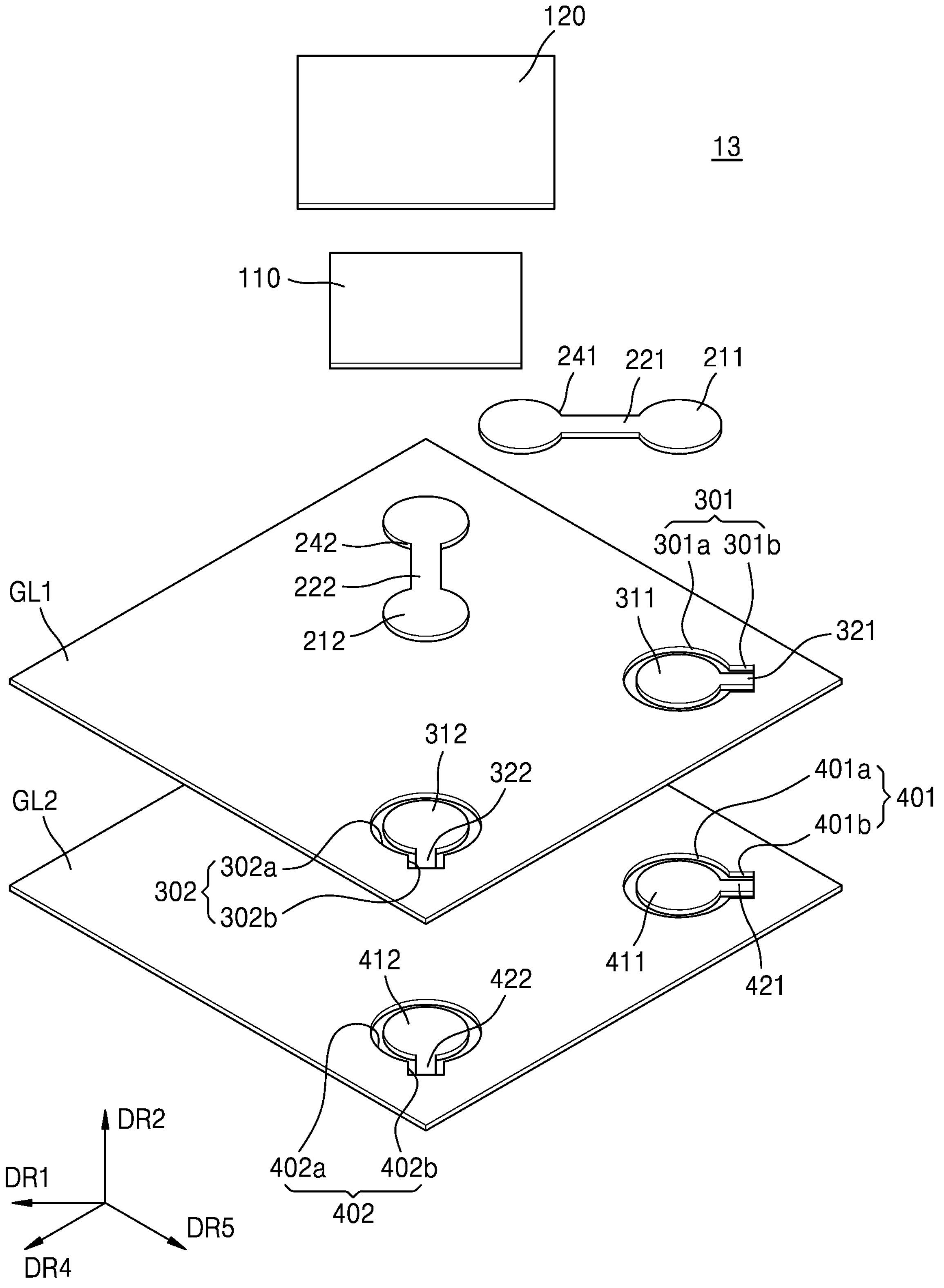
FIG. 14 is a perspective view illustrating a stacked patch antenna according to an exemplary embodiment.

FIG. 14 is a perspective view illustrating a stacked patch antenna according to an exemplary embodiment. For description brevity, the present disclosure will be described focusing on a difference from those described with reference to FIGS. 10 to 13.

Referring to FIG. 14, an X protruding pad and a Y protruding pad may not be provided. One end and the other end of the X connection via 231 along the third direction DR3 may respectively contact the X connection pad 241 and the lower antenna patch 110. One end and the other end of the Y connection via 232 along the third direction DR3 may respectively contact the Y connection pad 242 and the lower antenna patch 110.

According to the present disclosure, because impedance matching may be performed even when a size of the upper antenna patch 120 along a longitudinal direction (the first direction DR1) of the X feed line 221 or a longitudinal direction (the second direction DR2) of the Y feed line 222 is 15% or more greater than a size of the lower antenna patch 110, the stacked patch antenna 13 having a wide bandwidth may be provided.

Figure 15:
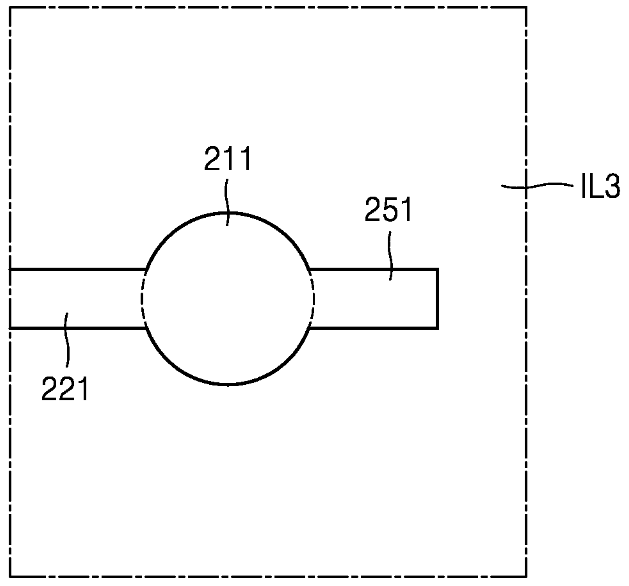
FIGS. 15 to 17 are views for describing feed stubs according to an exemplary embodiment.
Figure 16:
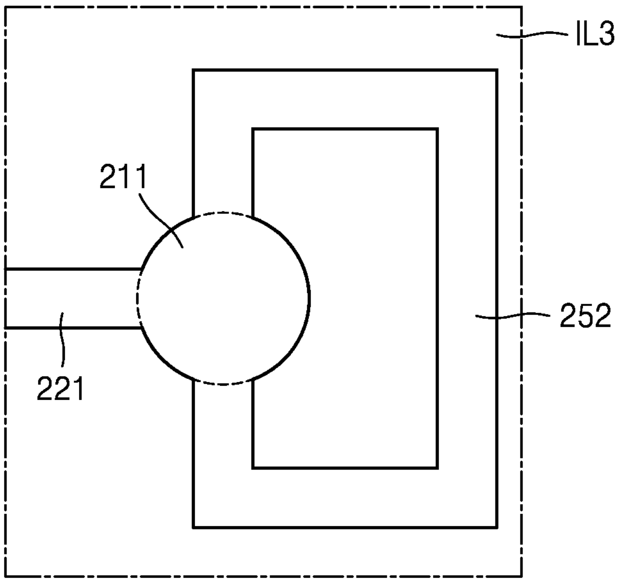
Figure 17:
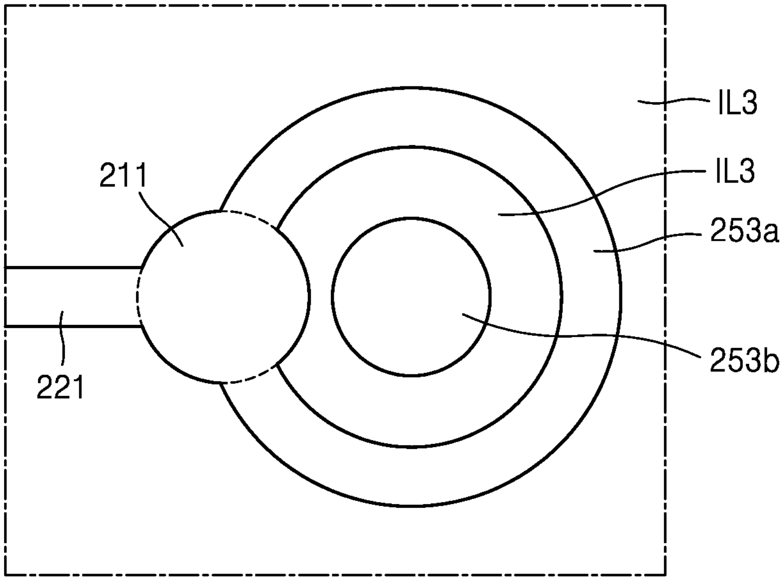

FIGS. 15 to 17 are views for describing feed stubs according to an exemplary embodiment. For description brevity, the same description as that made with reference to FIGS. 1 to 5 will be omitted.

Referring to FIG. 15, a first feed stub 251 may be provided. The first feed stub 251 may be provided on the third dielectric layer IL3. The first feed stub 251 may be provided opposite to the X feed line 221 with the X feed pad 211 therebetween. The first feed stub 251 may protrude from the X feed pad 211. The first feed stub 251 may extend along a direction parallel to an extension direction of the feed line 221. The first feed stub 251 may include a conductive material. For example, the first feed stub 251 may include copper (Cu), aluminum (Al), gold (Au), or silver (Ag). The X feed pad 211, the X feed line 221, and the first feed stub 251 may form a single structure. For example, the X feed pad 211, the X feed line 221, and the first feed stub 251 may be connected to each other without a boundary therebetween. When a high-frequency electrical signal (or a high-frequency feed signal) is applied to the first feed stub 251, the first feed stub 251 may constitute an inductor used for impedance matching.

The description made with reference to FIG. 15 may apply to a Y feed pad and a Y feed line. For example, the X feed pad 211 and the X feed line 221 of FIG. 15 may be replaced with the Y feed pad 212 and the Y feed line 222 described with reference to FIGS. 1 to 5.

Referring to FIG. 16, a second feed stub 252 may be provided. The second feed stub 252 may extend from one side of the X feed pad 211 to the other side. The second feed stub 252 may have a ring shape. Although the second feed stub 252 has a quadrangular ring shape, this is merely an example. A shape of the second feed stub 252 may be determined as needed. The second feed stub 252 may include a conductive material. For example, the second feed stub 252 may include copper (Cu), aluminum (Al), gold (Au), or silver (Ag). The X feed pad 211, the X feed line 221, and the second feed stub 252 may form a single structure. For example, the X feed pad 211, the X feed line 221, and the second feed stub 252 may be connected to each other without a boundary therebetween. When a high-frequency electrical signal (or a high-frequency feed signal) is applied to the second feed stub 252, the second feed stub 252 may constitute an inductor used for impedance matching.

The description made with reference to FIG. 16 may apply to a Y feed pad and a Y feed line. For example, the description of the X feed pad 211 and the X feed line 221 of FIG. 16 may be replaced with the Y feed pad 212 and the Y feed line 222 described with reference to FIGS. 1 to 5.

Referring to FIG. 17, a third feed stub 253*a* and an auxiliary pad 253*b* may be provided. The third feed stub 253*a* may extend from one side of the X feed pad 211 to the other side. The third feed stub 253*a* may have a ring shape. Although the third feed stub 253*a* has a quadrangular ring shape, this is merely an example. A shape of the third feed stub 253*a* may be determined as needed. The third feed stub 253*a* may include a conductive material. For example, the third feed stub 253*a* may include copper (Cu), aluminum (Al), gold (Au), or silver (Ag). The X feed pad 211, the X feed line 221, and the third feed stub 253*a* may form a single structure. For example, the X feed pad 211, the X feed line 221, and the third feed stub 253*a* may be connected to each other without a boundary therebetween.

The auxiliary pad 253*b* may be surrounded by the third feed stub 253*a*. The auxiliary pad 253*b* may be spaced apart from the X feed pad 211 and the third feed stub 253*a*. Although the auxiliary pad 253*b* has a circular shape, this is merely an example. A shape of the auxiliary pad 253*b* may be determined as needed. The auxiliary pad 253*b* may include a conductive material. For example, the auxiliary pad 253*b* may include copper (Cu), aluminum (Al), gold (Au), or silver (Ag).

When a high-frequency electrical signal (or a high-frequency feed signal) is applied to the third feed stub 253*a*, the third feed stub 253*a* and the auxiliary pad 253*b* may constitute a capacitor used for impedance matching.

The description made with reference to FIG. 17 may apply to a Y feed pad and a Y feed line. For example, the X feed pad 211 and the X feed line 221 of FIG. 17 may be replaced with the Y feed pad 212 and the Y feed line 222 described with reference to FIGS. 1 to 5.

Figure 18:
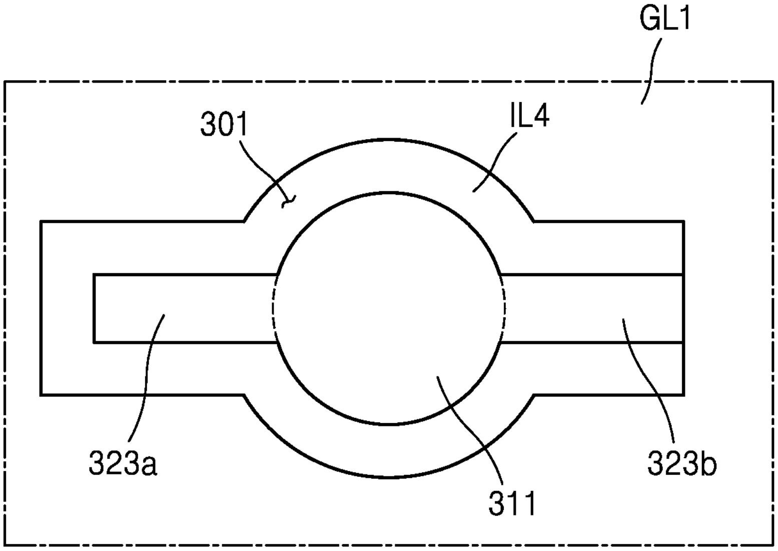
FIGS. 18 to 20 are views for describing an upper stub according to an exemplary embodiment.
Figure 19:
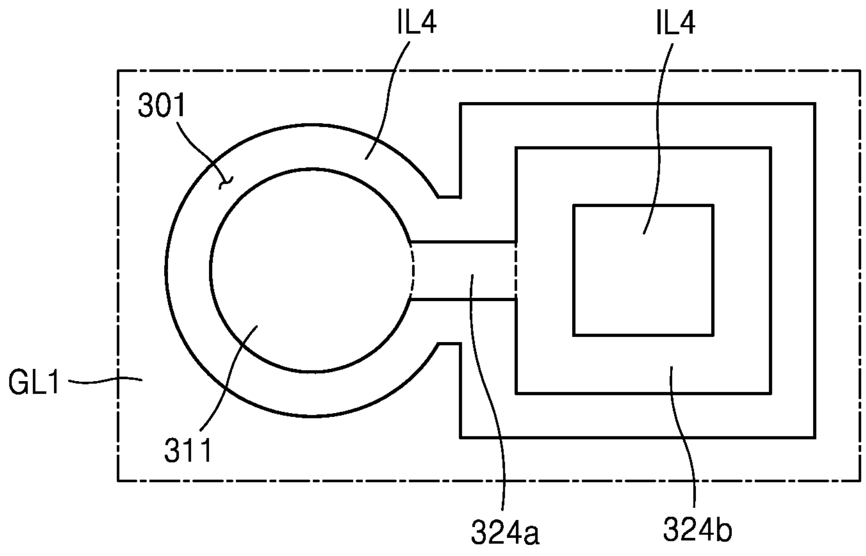
Figure 20:
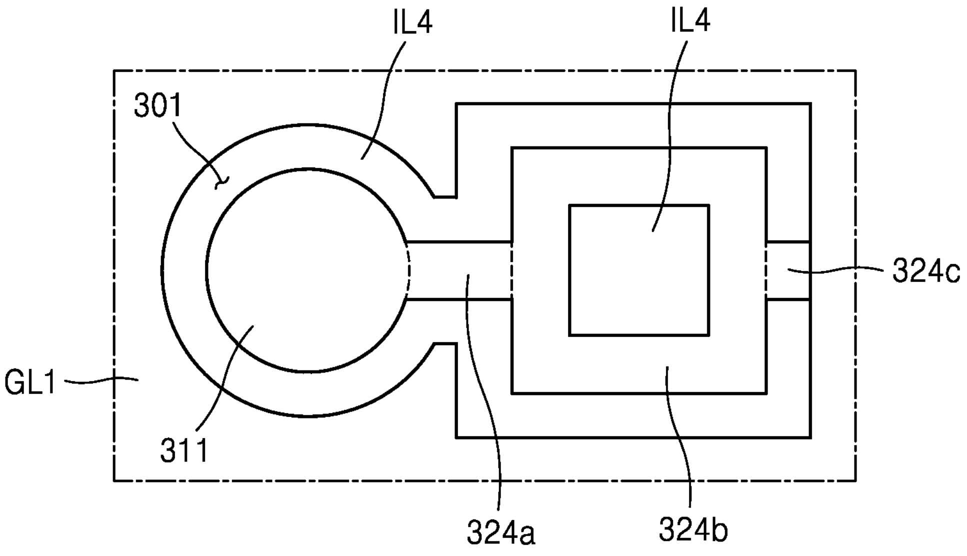

FIGS. 18 to 20 are views for describing an upper stub according to an exemplary embodiment. For description brevity, the present disclosure will be described focusing on a difference from those described with reference to FIGS. 1 to 5.

Referring to FIG. 18, a first A upper stub 323*a* and a second A upper stub 323*b* may be provided. The first A upper stub 323*a* and the second A upper stub 323*b* may be provided opposite to each other with the X upper pad 311 therebetween. The first A upper stub 323*a* and the second A upper stub 323*b* may extend in opposite directions from the X upper pad 311. The first A upper stub 323*a* may be spaced apart from the upper ground plate GL1. The second A upper stub 323*b* may contact the upper ground plate GL1. One end of the second A upper stub 323*b* along an extension direction may contact the X upper pad 311, and the other end of the second A upper stub 323*b* may contact the upper ground plate GL1. Side surfaces of the second A upper stub 323*b* along the extension direction may be spaced apart from the upper ground plate GL1.

Each of the first A upper stub 323*a* and the second A upper stub 323*b* may include a conductive material. For example, each of the first A upper stub 323*a* and the second A upper stub 323*b* may include copper (Cu), aluminum (Al), gold (Au), or silver (Ag). In an example, the first A upper stub 323*a*, the second A upper stub 323*b*, and the X upper pad 311 may form a single structure 311. For example, the first A upper stub 323*a*, the second A upper stub 323*b*, and the X upper pad 311 may be connected to each other without a boundary therebetween.

When a high-frequency electrical signal (or a high-frequency feed signal) is applied to the first A upper stub 323*a*, the first A upper stub 323*a* and the upper ground plate GL1 may constitute a capacitor used for impedance matching. When a high-frequency electrical signal (or a high-frequency feed signal) is applied to the second A upper stub 323*b*, the second A upper stub 323*b* and the upper ground plate GL1 may constitute a capacitor and an inductor used for impedance matching.

The description made with reference to FIG. 18 may apply to a Y upper pad. For example, the X upper pad 311 of FIG. 18 may be replaced with the Y upper pad 312 described with reference to FIGS. 1 to 5.

Referring to FIG. 19, a first B upper stub 324*a* and a second B upper stub 324*b* may be provided. The first B upper stub 324*a* may be provided between the second B upper stub 324*b* and the X upper pad 311. The X upper pad 311, the first B upper stub 324*a*, and the second B upper stub 324*b* may be arranged in one direction. Each of the first B upper stub 324*a* and the second B upper stub 324*b* may include a conductive material. For example, each of the first B upper stub 324*a* and the second B upper stub 324*b* may include copper (Cu), aluminum (Al), gold (Au), or silver (Ag). In an example, the first B upper stub 324*a*, the second B upper stub 324*b*, and the X upper pad 311 may form a single structure. For example, the first B upper stub 324*a*, the second B upper stub 324*b*, and the X upper pad 311 may be connected to each other without a boundary therebetween.

The first B upper stub 324*a* may extend in one direction. One end of the first B upper stub 324*a* along an extension direction may contact the X upper pad 311, and the other end of the first B upper stub 324*b* may contact the second B upper stub 324*b*. The first B upper stub 324*a* may be spaced apart from the upper ground plate GL1.

The second B upper stub 324*b* may have a ring shape. Although the second B upper stub 324*b* has a quadrangular ring shape, this is merely an example. In another example, the second B upper stub 324*b* may have a circular ring shape or a polygonal ring shape other than a quadrangular ring shape. The second B upper stub 324*b* may be spaced apart from the upper ground plate GL1. The fourth dielectric layer IL4 may be exposed inside the first B upper stub 324*a*.

When a high-frequency electrical signal (or a high-frequency feed signal) is applied to the first B upper stub 324*a* and the second B upper stub 324*b*, the first B upper stub 324*a*, the second B upper stub 324*b*, and the upper ground plate GL1 may constitute a capacitor used for impedance matching.

The description made with reference to FIG. 19 may apply to a Y upper pad. For example, the X upper pad 311 of FIG. 19 may be replaced with the Y upper pad 312 described with reference to FIGS. 1 to 5.

Referring to FIG. 20, a third B upper stub 324*c* may be provided. The third B upper stub 324*c* may be provided between the second B upper stub 324*b* and the upper ground plate GL1. The third B upper stub 324*c* may extend along a direction parallel to an extension direction of the first B upper stub 324*a*. One end of the first B upper stub 324*a* along the extension direction may contact the second B upper stub 324*b*, and the other end of the first B upper stub 324*a* may contact the upper ground plate GL1. The third B upper stub 324*c* may include a conductive material. For example, the third B upper stub 324*c* may include copper (Cu), aluminum (Al), gold (Au), or silver (Ag). In an example, the third B upper stub 324*c* and the second B upper stub 324*b* may form a single structure. For example, the third B upper stub 324*c* and the second B upper stub 324*b* may be connected to each other without a boundary therebetween.

When a high-frequency electrical signal (or a high-frequency feed signal) is applied to the first B upper stub 324*a*, the second B upper stub 324*b*, and the third B upper stub 324*c* through the X upper pad 311, the first B upper stub 324*a*, the second B upper stub 3214*b*, and the upper ground plate GL1 may constitute a capacitor used for impedance matching, and the third B upper stub 324*c* may constitute an inductor used for impedance matching.

The description made with reference to FIG. 20 may apply to a Y upper pad. For example, the X upper pad 311 of FIG. 20 may be replaced with the Y upper pad 312 described with reference to FIGS. 1 to 5.

Figure 21:
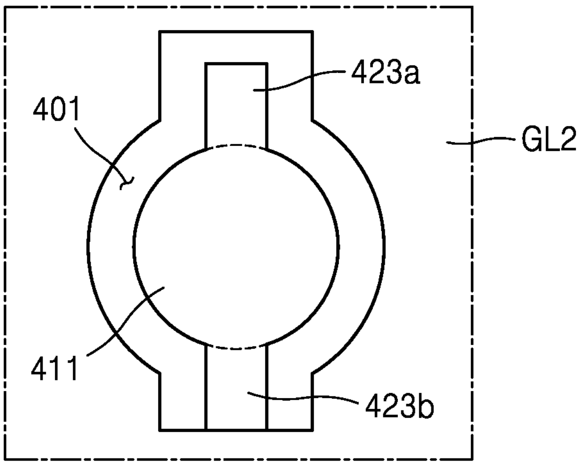
FIGS. 21 and 22 are views for describing a lower stub according to an exemplary embodiment.
Figure 22:
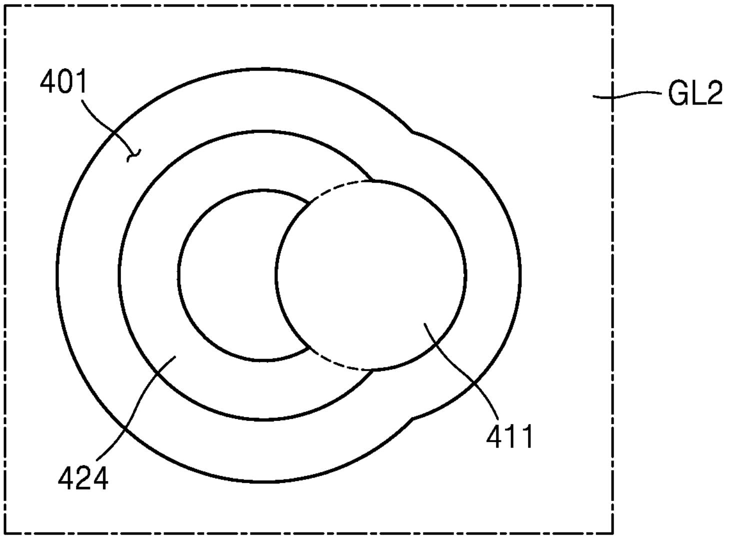

FIGS. 21 and 22 are views for describing a lower stub according to an exemplary embodiment. For description brevity, the present disclosure will be described focusing on a difference from those described with reference to FIGS. 1 to 5.

Referring to FIG. 21, a first A lower stub 423*a* and a second A lower stub 423*b* may be provided. The first A lower stub 423*a* and the second A lower stub 423*b* may be provided opposite to each other with the X lower pad 411 therebetween. The first A lower stub 423*a* and the second A lower stub 423*b* may extend in opposite directions from the X lower pad 411. The first A lower stub 423*a* may be spaced apart from the lower ground plate GL2. The second A lower stub 423*b* may contact the lower ground plate GL2. One end of the second A lower stub 423*b* along an extension direction may contact the X lower pad 411, and the other end of the second A lower stub 423*b* may contact the lower ground plate GL2. Side surfaces of the second A lower stub 423*b* along an extension direction may be spaced apart from the lower ground plate GL2.

Each of the first A lower stub 423*a* and the second A lower stub 423*b* may include a conductive material. For example, each of the first A lower stub 423*a* and the second A lower stub 423*b* may include copper (Cu), aluminum (Al), gold (Au), or silver (Ag). In an example, the first A lower stub 423*a*, the second A lower stub 423*b*, and the X lower pad 411 may form a single structure. For example, the first A lower stub 423*a*, the second A lower stub 423*b*, and the X lower pad 411 may be connected to each other without a boundary therebetween.

When a high-frequency electrical signal (or a high-frequency feed signal) is applied to the first A lower stub 423*a*, the first A lower stub 423*a* and the lower ground plate GL2 may constitute a capacitor used for impedance matching. When a high-frequency electrical signal (or a high-frequency feed signal) is applied to the second A lower stub 423*b*, the second A lower stub 423*b* and the lower ground plate GL2 may constitute a capacitor and an inductor used for impedance matching.

The description made with reference to FIG. 21 may apply to a Y lower pad. For example, the X lower pad 411 of FIG. 21 may be replaced with the Y upper pad 412 described with reference to FIGS. 1 to 5.

Referring to FIG. 22, a second lower stub 424 may be provided. The second lower stub 424 may extend from one side of the X lower pad 411 to the other side. The second lower stub 424 may have a ring shape. Although the second lower stub 424 has a circular ring shape, this is merely an example. A shape of the second lower stub 424 may be determined as needed. The second lower stub 424 may include a conductive material. For example, the second lower stub 424 may include copper (Cu), aluminum (Al), gold (Au), or silver (Ag). The X lower pad 411 and the second lower stub 424 may form a single structure. For example, the X lower pad 411 and the second lower stub 424 may be connected to each other without a boundary therebetween. When a high-frequency electrical signal (or a high-frequency feed signal) is applied to the second lower stub 424, the second lower stub 424 and the lower ground plate GL2 may constitute a capacitor used for impedance matching.

The description made with reference to FIG. 22 may apply to a Y lower pad. For example, the X lower pad 411 of FIG. 22 may be replaced with the Y upper pad 412 described with reference to FIGS. 1 to 5.

Figure 23:
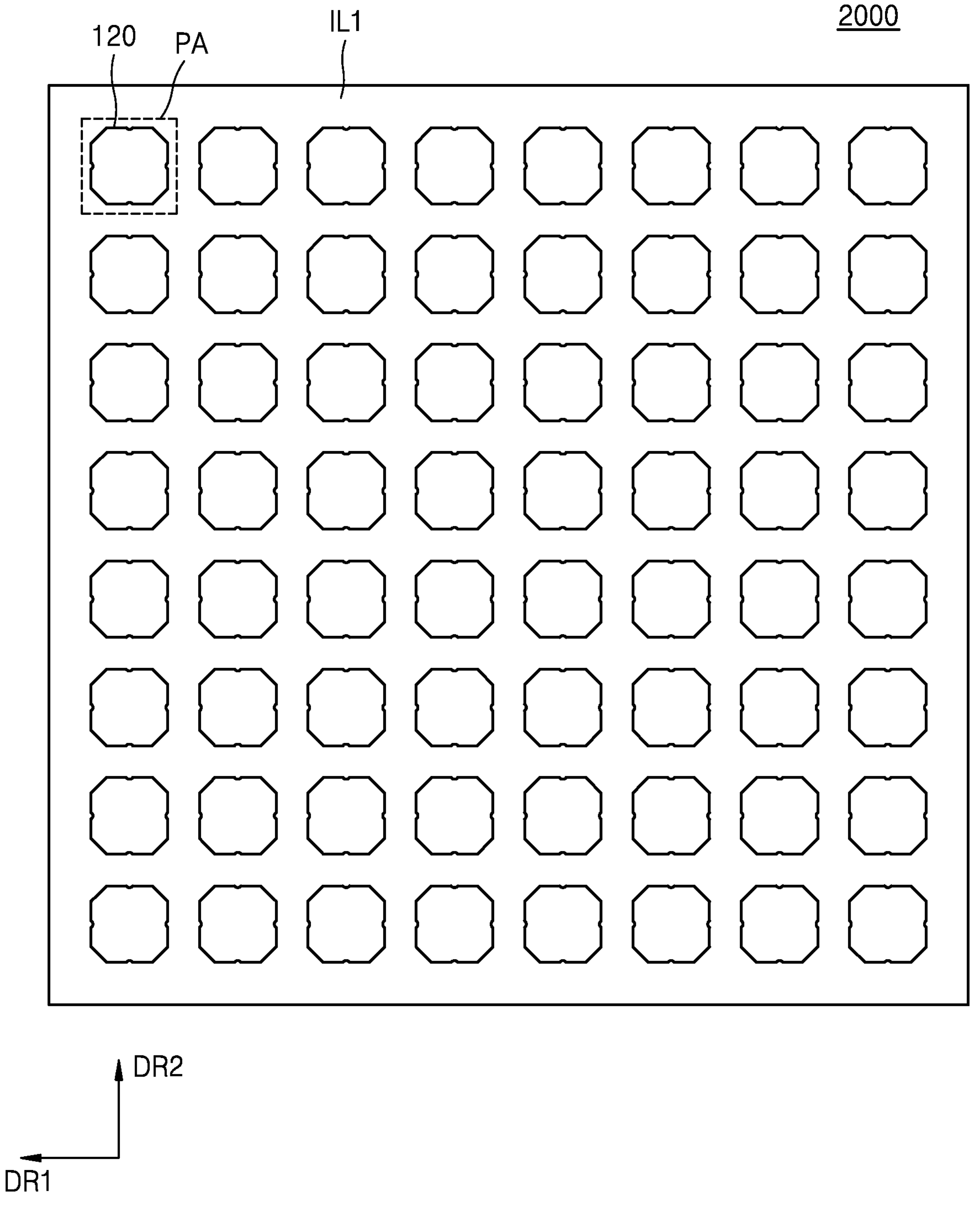
FIG. 23 is a plan view illustrating an antenna array according to an exemplary embodiment.

FIG. 23 is a plan view illustrating an antenna array according to an exemplary embodiment.

Referring to FIG. 23, an antenna array 2000 may be provided. The antenna array 2000 may include a plurality of stacked patch antennas PA arranged along the first direction DR1 and the second direction DR2. Each of the plurality of stacked patch antennas PA may be one of the stacked patch antennas 10, 11, 12, and 13 described above.

The upper antenna patch 120 may be provided on the first dielectric layer IL1. Elements other than the upper antenna patch 120 may be provided under the first dielectric layer IL1. Each of the plurality of stacked patch antennas PA may operate independently or some stacked patch antennas PA may operate together.

According to the present disclosure, there may be provided the antenna array 2000 including the stacked patch antenna PA that implements a broadband matching circuit capable of impedance matching even when the upper antenna patch 120 and the lower antenna patch 110 (see FIG. 1) have a large size difference along a longitudinal direction (the first direction DR1) of the X feed line 221 (see FIG. 1) or a longitudinal direction (the second direction DR2) of the Y feed line 222 (see FIG. 1).

Figure 24:
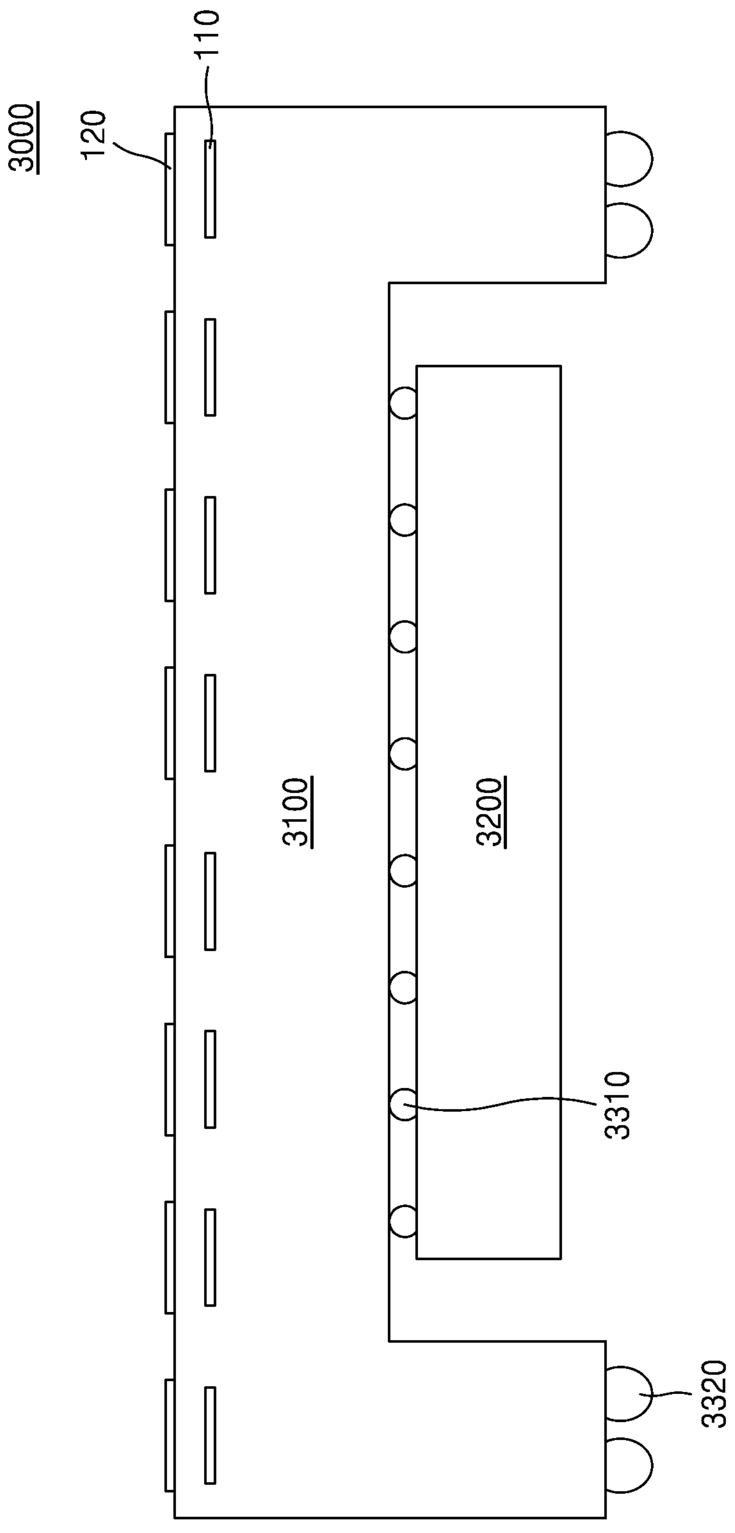
FIG. 24 is a cross-sectional view illustrating an antenna package according to an exemplary embodiment.

FIG. 24 is a cross-sectional view illustrating an antenna package according to an exemplary embodiment.

Referring to FIG. 24, an antenna package 3000 may be provided. The antenna package 3000 may include an antenna array 3100 and a control chip 3200. The antenna array 3100 may be substantially the same as the antenna array 2000 described with reference to FIG. 23. The antenna array 3100 may include a plurality of upper antenna patches 110 and a plurality of lower antenna patches 120. A plurality of outer solders 3320 may be provided on a bottom surface of the antenna array 3100, to electrically connect the stacked patch antennas PA to an external device.

The control chip 3200 may be provided adjacent to the antenna array 3100. Although the control chip 3200 is located under the antenna array, this is merely an example. A position of the control chip 3200 may be determined as needed. The control chip 3200 may control the antenna array 3100. For example, the control chip 3200 may provide a high-frequency electrical signal (or a high-frequency feed signal) to the plurality of upper antenna patches 110 and the plurality of lower antenna patches 120. A plurality of inner solders 3310 may be provided between the control chip 3200 and the antenna array 3100, to transmit electrical signals.

According to the present disclosure, there may be provided the antenna package 3000 including the stacked patch antenna that implements a broadband matching circuit capable of impedance matching even when the upper antenna patch 120 and the lower antenna patch 110 have a large size difference along a longitudinal direction (the first direction DR1 of FIG. 1) of the X feed line 221 (see FIG. 1) or a longitudinal direction (the second direction DR2 of FIG. 1) of the Y feed line 222 (see FIG. 1).

The description of embodiments of the technical spirit of the present disclosure provides an example for describing the technical spirit of the present disclosure. Accordingly, the technical spirit of the present disclosure is not limited to the above embodiments, and it is obvious to one of ordinary skill in the art that various modifications and changes such as combinations of the embodiments may be made within the technical spirit and scope of the present disclosure.

The invention claimed is:

1. A stacked patch antenna comprising:
- an upper ground plate comprising an upper hole;
- a first feed pad provided on the upper ground plate;
- a first feed line extending from the first feed pad along a first direction;
- a lower antenna patch provided on the first feed pad;
- an upper antenna patch provided on the lower antenna patch;
- a first upper pad provided in the upper hole; and
- a first upper stub protruding from a side surface of the first upper pad,
- wherein a first end among both ends of the first upper stub contacts the first upper pad and a second end of the first upper stub contacts the upper ground plate.

2. The stacked patch antenna of claim 1, wherein a size of the upper antenna patch along the first direction is 15% or more greater than a size of the lower antenna patch along the first direction.

3. The stacked patch antenna of claim 1, further comprising:
- a second feed pad provided on the upper ground plate; and
- a second feed line extending from the second feed pad along a second direction intersecting the first direction,
- wherein a size of the upper antenna patch along the second direction is 15% or more greater than a size of the lower antenna patch along the second direction.

4. The stacked patch antenna of claim 3, further comprising:
- a second upper pad overlapping the second feed pad along a third direction perpendicular to the first and second directions; and
- a second upper stub protruding from a side surface of the second upper pad.

5. The stacked patch antenna of claim 1, wherein the first feed line is provided between the lower antenna patch and the upper ground plate.

6. The stacked patch antenna of claim 1, further comprising:
- a lower ground plate provided opposite to the lower antenna patch with the upper ground plate therebetween;
- a first lower pad provided in a lower hole of the lower ground plate; and
- a first lower stub protruding from a side surface of the first lower pad,
- wherein the first lower stub is spaced apart from the lower ground plate.

7. The stacked patch antenna of claim 6, further comprising:
- a second lower stub protruding from the side surface of the first lower pad,
- wherein the second lower stub is spaced apart from the lower ground plate.

8. The stacked patch antenna of claim 6, further comprising:
- a second lower stub protruding from the side surface of the first lower pad,
- wherein the second lower stub contacts the lower ground plate.

9. The stacked patch antenna of claim 6,
- wherein the first lower stub protrudes from a first side of the first lower pad, and
- wherein the first lower stub is connected to a second side of the first lower pad opposite to the first side.

10. The stacked patch antenna of claim 1, wherein the first upper stub is spaced apart from the upper ground plate.

11. The stacked patch antenna of claim 10, further comprising:
- a second upper stub protruding from the upper ground plate,
- wherein the second upper stub contacts the upper ground plate.

12. The stacked patch antenna of claim 10, further comprising:
- a third upper stub located opposite to the first upper pad with the first upper stub therebetween,
- wherein the third upper stub has a ring shape, and
- wherein the third upper stub is spaced apart from the upper ground plate.

13. The stacked patch antenna of claim 12, further comprising:
- a fourth upper stub provided between the third upper stub and the upper ground plate,
- wherein the fourth upper stub contacts the third upper stub and the upper ground plate.

14. An antenna array comprising a plurality of stacked patch antennas,
- wherein each of the plurality of stacked patch antennas comprises an upper ground plate comprising an upper hole, a first feed pad provided on the upper ground plate, a first feed line extending from the first feed pad along a first direction, a lower antenna patch provided on the first feed pad, an upper antenna patch provided on the lower antenna patch, a first upper pad provided in the upper hole, and a an upper stub protruding from a side surface of the first upper pad, and
- wherein a first end among both ends of the upper stub contacts the first upper pad and a second end of the upper stub contacts the upper ground plate.

15. An antenna package comprising:

a plurality of stacked patch antennas; and a control chip configured to provide a high-frequency electrical signal (or a high-frequency feed signal) to the plurality of stacked patch antennas, wherein each of the plurality of stacked patch antennas comprises an upper ground plate comprising an upper hole, a first feed pad provided on the upper ground plate, a first feed line extending from the first feed pad along a first direction, a lower antenna patch provided on the first feed pad, an upper antenna patch provided on the lower antenna patch, a first upper pad provided in the upper hole, and an upper stub protruding from a side surface of the first upper pad, and wherein a first end among both ends of the upper stub contacts the first upper pad and a second end of the upper stub contacts the upper ground plate.

* * * * *